(12) United States Patent
Ponnamperuma Arachchi et al.

(10) Patent No.: US 12,072,874 B2
(45) Date of Patent: Aug. 27, 2024

(54) METHODS, APPARATUSES AND COMPUTER PROGRAM PRODUCTS FOR PROVIDING A CONVERSATIONAL DATA-TO-TEXT SYSTEM

(71) Applicant: Arria Data2Text Limited, Aberdeen (GB)

(72) Inventors: Kapila Anuruddha Ponnamperuma Arachchi, Aberdeen (GB); Rodrigo Gomes De Oliveira, London (GB); John William Alexander, London (GB); Daniel da Silva De Paiva, Brighton (GB); Neil Stuart Burnett, Banchory (GB)

(73) Assignee: Arria Data2Text Limited, Aberdeen (GB)

(*) Notice: Subject to any disclaimer, the term of this patent is extended or adjusted under 35 U.S.C. 154(b) by 0 days.

(21) Appl. No.: 17/462,988

(22) Filed: Aug. 31, 2021

(65) Prior Publication Data
US 2022/0067038 A1 Mar. 3, 2022

Related U.S. Application Data

(60) Provisional application No. 63/072,569, filed on Aug. 31, 2020.

(51) Int. Cl.
*G06F 16/242* (2019.01)
(52) U.S. Cl.
CPC ................... *G06F 16/243* (2019.01)
(58) Field of Classification Search
CPC ....................................... G06F 16/243
USPC ......................................... 707/760
See application file for complete search history.

(56) References Cited

U.S. PATENT DOCUMENTS

| | | | | |
|---|---|---|---|---|
| 6,523,006 | B1* | 2/2003 | Ellis | H04S 1/005 |
| | | | | 704/270 |
| 7,716,174 | B2* | 5/2010 | Lee | G06F 16/256 |
| | | | | 707/718 |
| 10,909,111 | B2* | 2/2021 | Chang | G06F 16/2425 |
| 11,288,321 | B1* | 3/2022 | Rose | G06F 40/40 |
| 2006/0161544 | A1* | 7/2006 | Lee | G06F 16/24522 |
| 2014/0372116 | A1* | 12/2014 | Smith | B25J 13/003 |
| | | | | 704/235 |
| 2017/0116260 | A1* | 4/2017 | Chattopadhyay | G06F 16/243 |
| 2018/0052842 | A1* | 2/2018 | Hewavitharana | G06F 40/30 |
| 2018/0144064 | A1* | 5/2018 | Krasadakis | G06F 16/90332 |
| 2018/0268023 | A1* | 9/2018 | Korpusik | G06N 5/022 |
| 2018/0314689 | A1* | 11/2018 | Wang | G10L 15/1822 |
| 2019/0213167 | A1* | 7/2019 | Bettencourt da Silva | G06F 40/30 |

(Continued)

*Primary Examiner* — Cam Linh T Nguyen
(74) *Attorney, Agent, or Firm* — ALSTON & BIRD LLP

(57) ABSTRACT

Methods, apparatuses and computer program products for providing a conversational data-to-text system are described herein. An example method may include receiving a first natural language query from a client device; generating a first analytic operation instruction associated with a multi-dimensional dataset based at least in part on the first natural language query; determining a first multi-dimensional data object based at least in part on the first analytic operation instruction and the multi-dimensional dataset; generating a first natural language response to the first natural language query based at least in part on the first multi-dimensional data object; and transmitting the first natural language response to the client device.

27 Claims, 7 Drawing Sheets

(56) References Cited

U.S. PATENT DOCUMENTS

| | | | |
|---|---|---|---|
| 2020/0026592 A1* | 1/2020 | Ramaiyer | G06F 11/3438 |
| 2020/0097490 A1* | 3/2020 | Pandey | G06F 16/24522 |
| 2020/0183916 A1* | 6/2020 | Shultis | G16H 10/60 |
| 2020/0210524 A1* | 7/2020 | Yang | G06N 20/20 |
| 2020/0380985 A1* | 12/2020 | Gada | G06F 3/167 |
| 2021/0041231 A1* | 2/2021 | Karube | G01B 11/2536 |
| 2021/0294568 A1* | 9/2021 | Summers, II | G09B 21/006 |
| 2021/0409891 A1* | 12/2021 | Zhang | G06F 3/167 |

* cited by examiner

METHODS, APPARATUSES AND COMPUTER PROGRAM PRODUCTS FOR PROVIDING A CONVERSATIONAL DATA-TO-TEXT SYSTEM

CROSS-REFERENCE TO RELATED APPLICATIONS

The present application claims priority to U.S. Provisional Application Ser. No. 63/072,569, titled "METHODS, APPARATUSES AND COMPUTER PROGRAM PRODUCTS FOR PROVIDING A CONVERSATONAL DATA-TO-TEXT SYSTEM," filed Aug. 31, 2020, the contents of which are incorporated herein by reference in their entirety.

TECHNOLOGICAL FIELD

Embodiments of the present disclosure relate generally to natural language querying technologies and, more particularly, relate to methods, apparatuses, and computer program products for providing a conversational data-to-text system.

BACKGROUND

In the present disclosure, the term "query system" refers a system that generates a response based on a query received from a user. Applicant has identified many technical limitations and deficiencies associated with query systems.

For example, many query systems require a user to formulate a query in a specific format in order to interact and/or communicate with query systems. For example, these query systems may define a set of unique syntax rules that a user must follow when providing the query to these systems, and may generate a response that is based on these syntax rules. In such examples, users are not able to interact and/or communicate with the query systems using natural language, and may risk mistakes and errors when converting their queries based on these syntax rules, which in turn may result in information loss and miscommunication between the user and the query systems.

As another example, many query systems may only be capable of receiving a one-shot input from a user and generate a one-shot output to the user. Such systems may not be able to infer information based on history of communications and/or interactions between the user and the query system when generating an output. These limitations may cause performance and capability of such query systems to deteriorate. For example, a user may receive sales data associated with a product in France from the query system, and may subsequently want to receive sales data associated with the same product in Germany. The user may provide a query to the query system that represents the following question:

How about in Germany?

Because the above query does not explicitly define the product or the type of information that the user wants, the query system may fail to understand the query and may be unable to provide the sales data that the user requested.

BRIEF SUMMARY

Embodiments of the present disclosure provide methods, apparatus, systems, computing devices, and/or the like for providing a conversational data-to-text system.

In accordance with examples of the present disclosure, an apparatus is provided. In some embodiments, the apparatus comprises at least one processor and at least one non-transitory memory comprising program code. In some embodiments, the at least one non-transitory memory and the program code are configured to, with the at least one processor, cause the apparatus to at least: receive a first natural language query from a client device; generate a first analytic operation instruction associated with a multi-dimensional dataset based at least in part on the first natural language query; determine a first multi-dimensional data object based at least in part on the first analytic operation instruction and the multi-dimensional dataset; generate a first natural language response to the first natural language query based at least in part on the first multi-dimensional data object; and transmit the first natural language response to the client device.

In some embodiments, the first analytic operation instruction defines at least one query parameter and at least one analytic operation type.

In some embodiments, the at least one query parameter corresponds to a dimension instance in a feature space associated with the multi-dimensional dataset.

In some embodiments, the at least one analytic operation type comprises one or more of a filtering operation, a grouping operation, or a variance operation.

In some embodiments, when determining the first multi-dimensional data object based at least in part on the first analytic operation instruction, the at least one non-transitory memory and the program code are configured to, with the at least one processor, cause the apparatus to further: retrieve a plurality of multi-dimensional data objects based at least in part on the at least one query parameter; and generate the first multi-dimensional data object based on performing at least one analytic operation on the plurality of multi-dimensional data objects.

In some embodiments, wherein, when generating the first natural language response to the first natural language query, the at least one non-transitory memory and the program code configured to, with the at least one processor, cause the apparatus to further: select a narrative function script based on the first natural language query; and generate the first natural language response based at least in part on the narrative function script, the first analytic operation instruction, and the first multi-dimensional data object.

In some embodiments, subsequent to transmitting the first natural language response to the client device, the at least one non-transitory memory and the program code are configured to, with the at least one processor, cause the apparatus to further: update contextual data stored in a discourse model based at least in part on the first natural language query and the first natural language response; receive a second natural language query from the client device; generate a second analytic operation instruction associated with the multi-dimensional dataset based at least in part on the second natural language query and the contextual data; determine a second multi-dimensional data object based at least in part on the second analytic operation instruction and the multi-dimensional dataset; generate a second natural language response to the second natural language query based at least in part on the second multi-dimensional data object; and transmit the second natural language response to the client device.

In some embodiments, when generating the second analytic operation instruction, the at least one non-transitory memory and the program code are configured to, with the at least one processor, cause the apparatus to further: generate at least one inferred query parameter based on the second natural language query and the contextual data.

In some embodiments, when determining the second multi-dimensional data object, the at least one non-transitory memory and the program code are configured to, with the at least one processor, cause the apparatus to further: determine the second multi-dimensional data object based at least in part on the at least one inferred query parameter.

In accordance with examples of the present disclosure, a computer-implemented method is provided. The computer-implemented method comprises receiving a first natural language query from a client device; generating a first analytic operation instruction associated with a multi-dimensional dataset based at least in part on the first natural language query; determining a first multi-dimensional data object based at least in part on the first analytic operation instruction and the multi-dimensional dataset; generating a first natural language response to the first natural language query based at least in part on the first multi-dimensional data object; and transmitting the first natural language response to the client device.

In accordance with examples of the present disclosure, a computer program product is provided. In some embodiments, the computer program product comprises at least one non-transitory computer-readable storage medium having computer-readable program code portions stored therein. In some embodiments, the computer-readable program code portions comprising an executable portion configured to: receive a first natural language query from a client device; generate a first analytic operation instruction associated with a multi-dimensional dataset based at least in part on the first natural language query; determine a first multi-dimensional data object based at least in part on the first analytic operation instruction and the multi-dimensional dataset; generate a first natural language response to the first natural language query based at least in part on the first multi-dimensional data object; and transmit the first natural language response to the client device.

The above summary is provided merely for the purpose of summarizing some example embodiments to provide a basic understanding of some aspects of the disclosure. Accordingly, it will be appreciated that the above-described embodiments are merely examples and should not be construed to narrow the scope or spirit of the disclosure. It will be appreciated that the scope of the disclosure encompasses many potential embodiments in addition to those here summarized, some of which will be further described below.

BRIEF DESCRIPTION OF THE DRAWINGS

Figure 1:
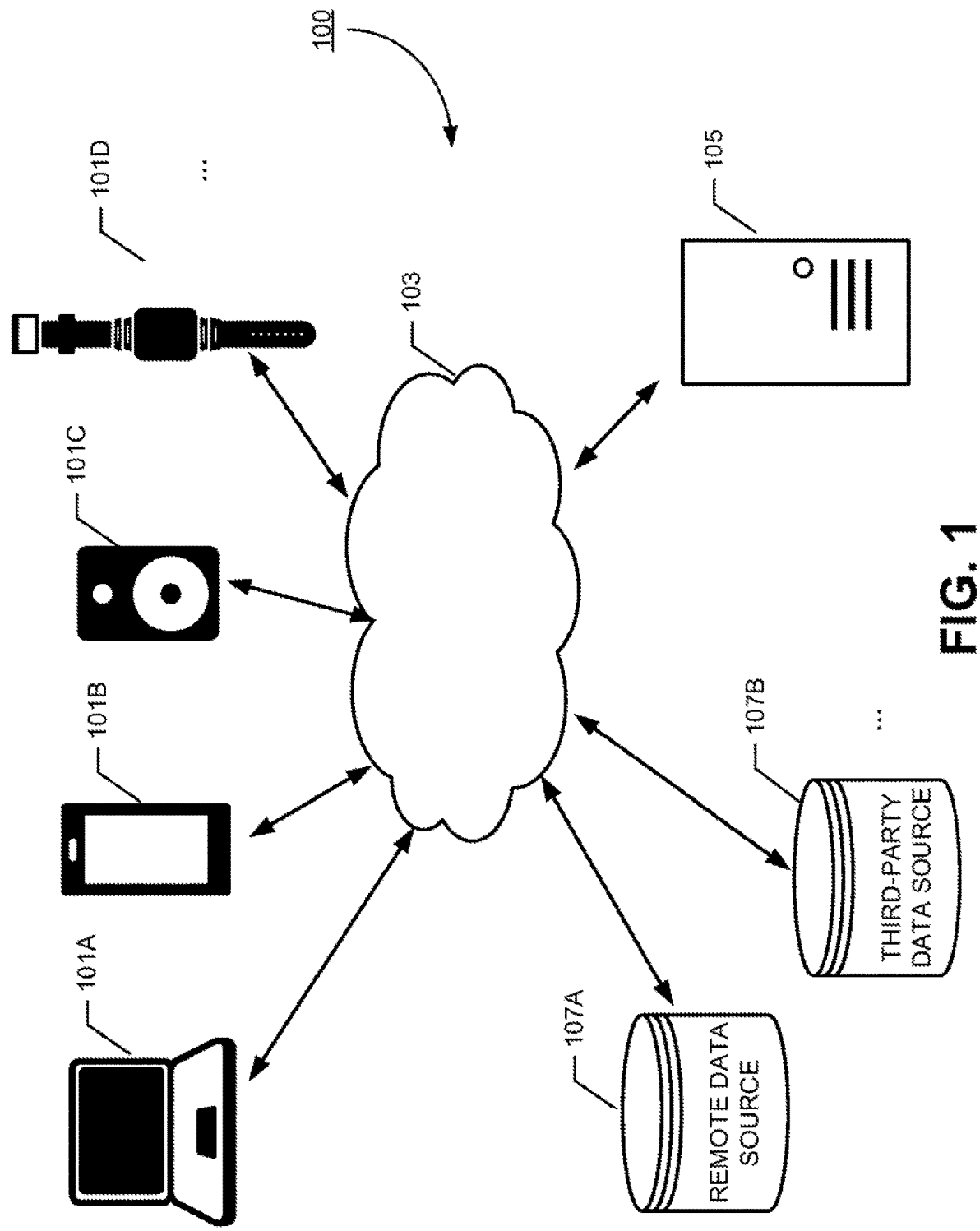
Figure 2:
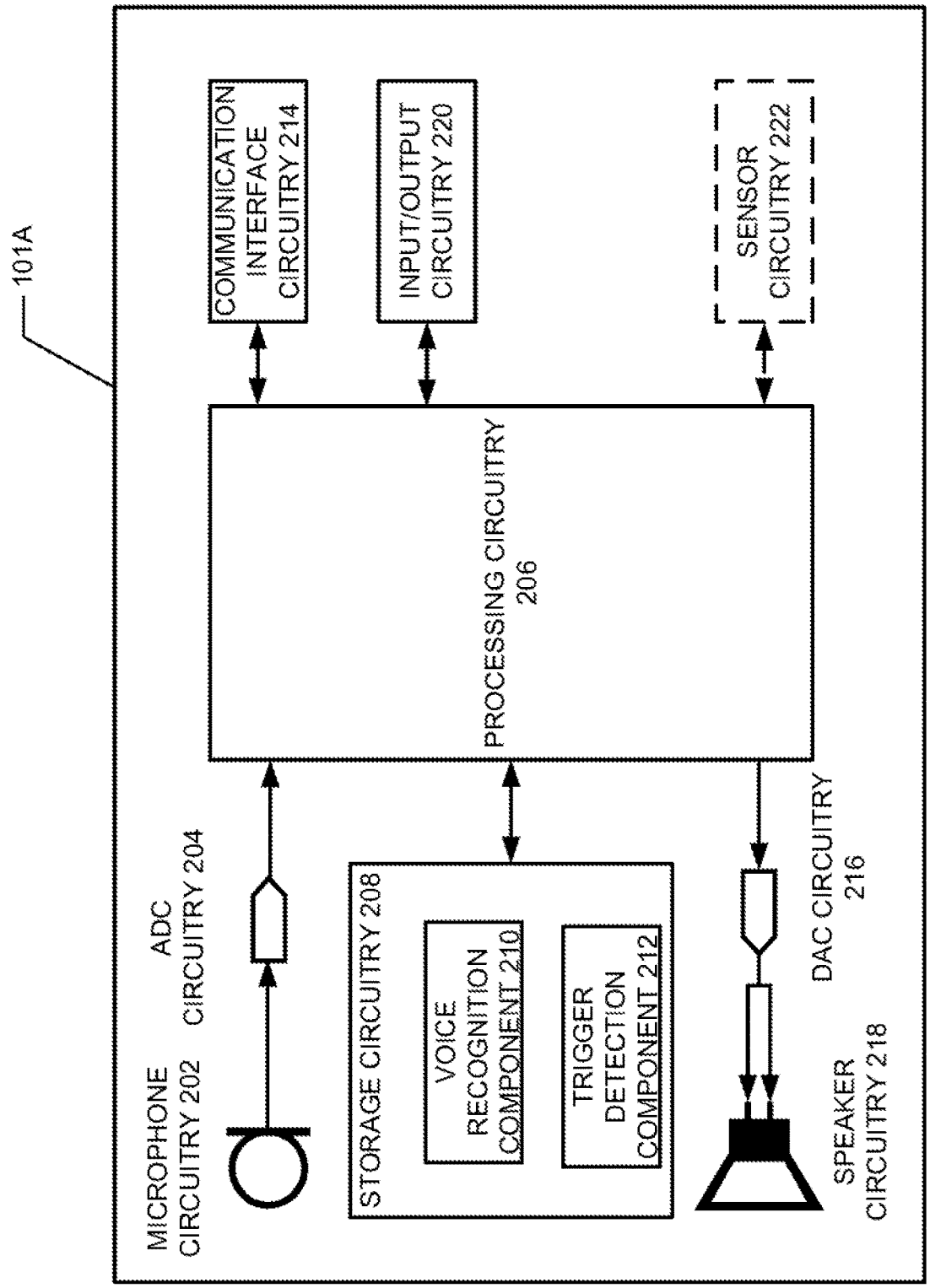
Figure 3:
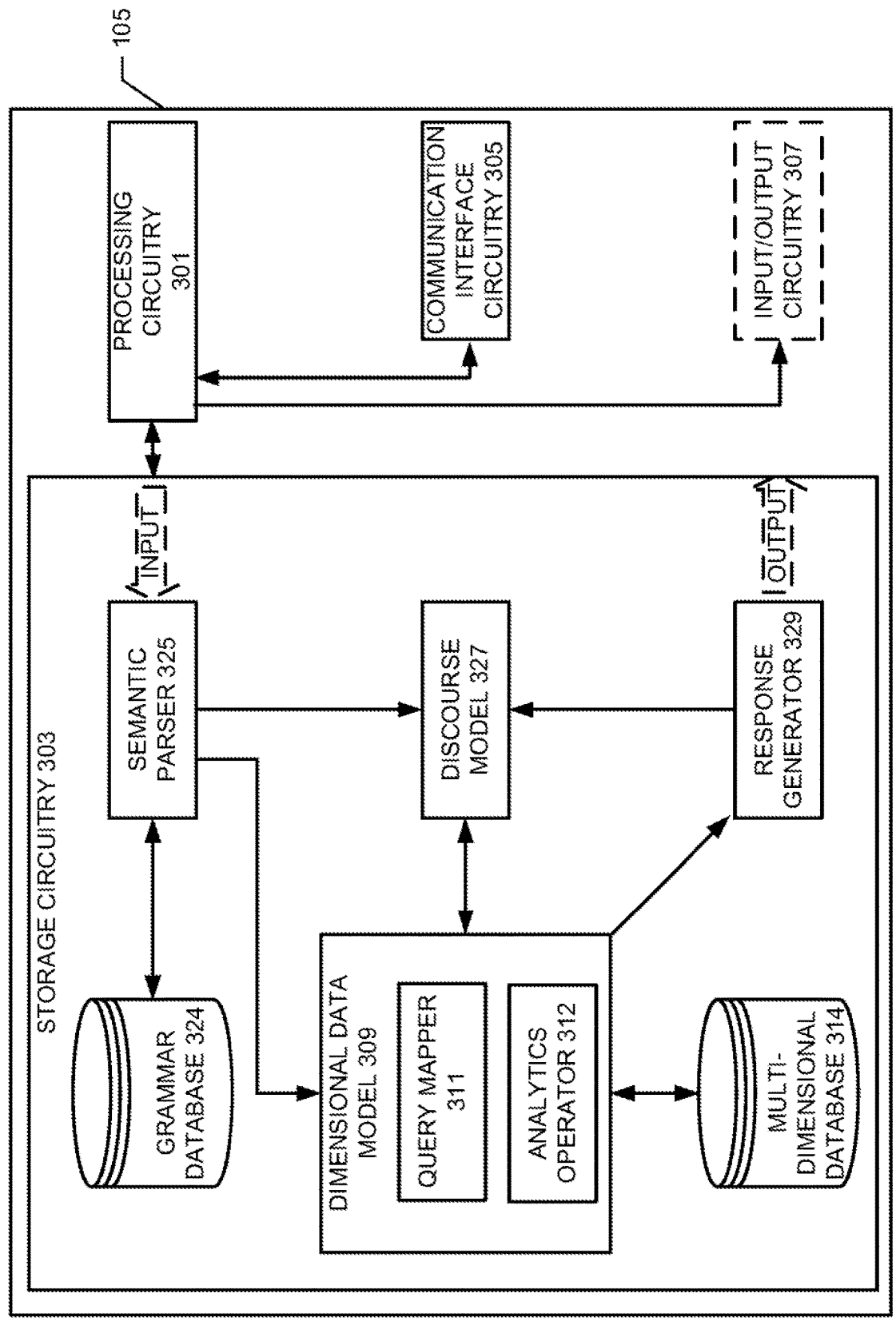
Figure 4:
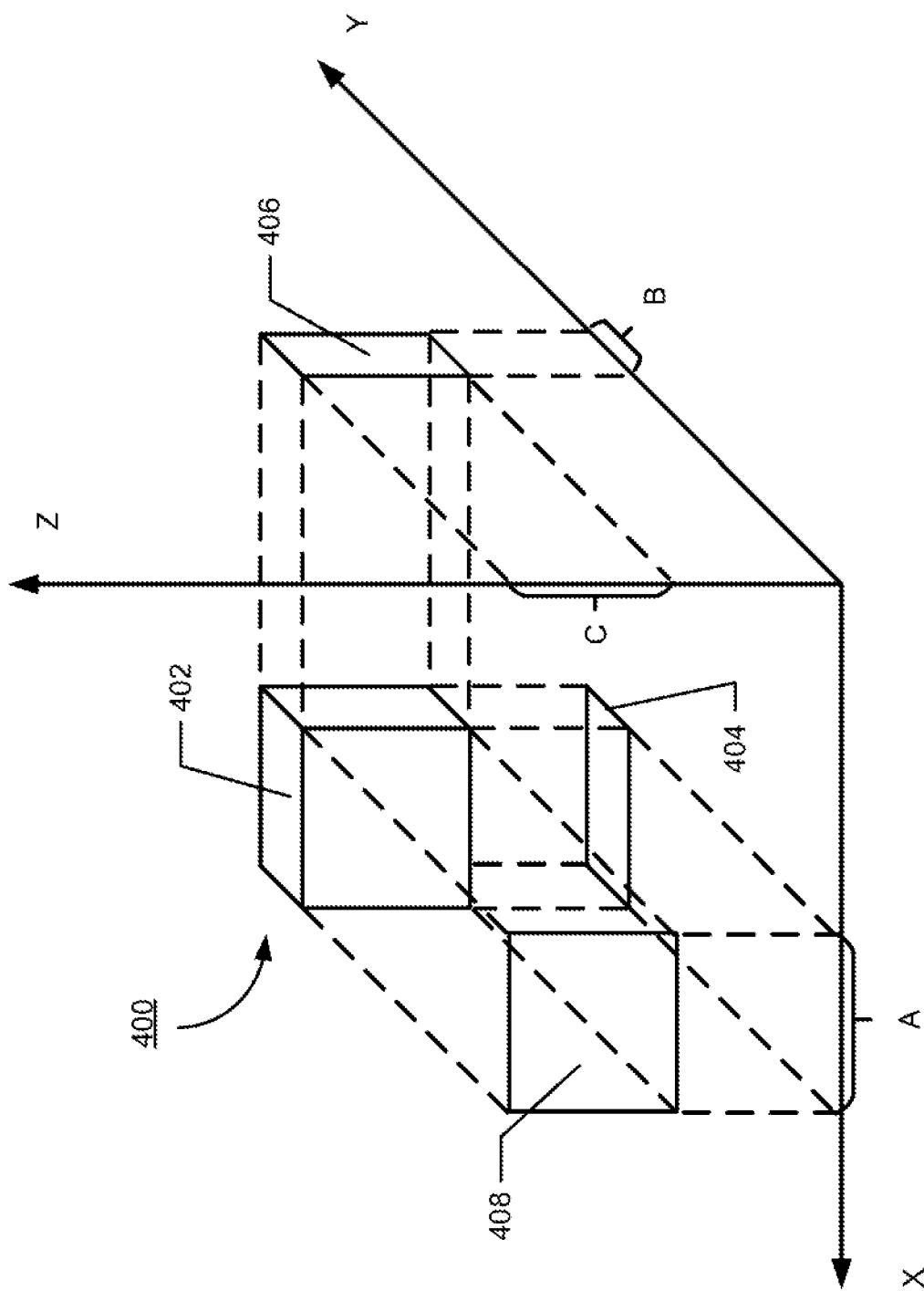
Figure 5:
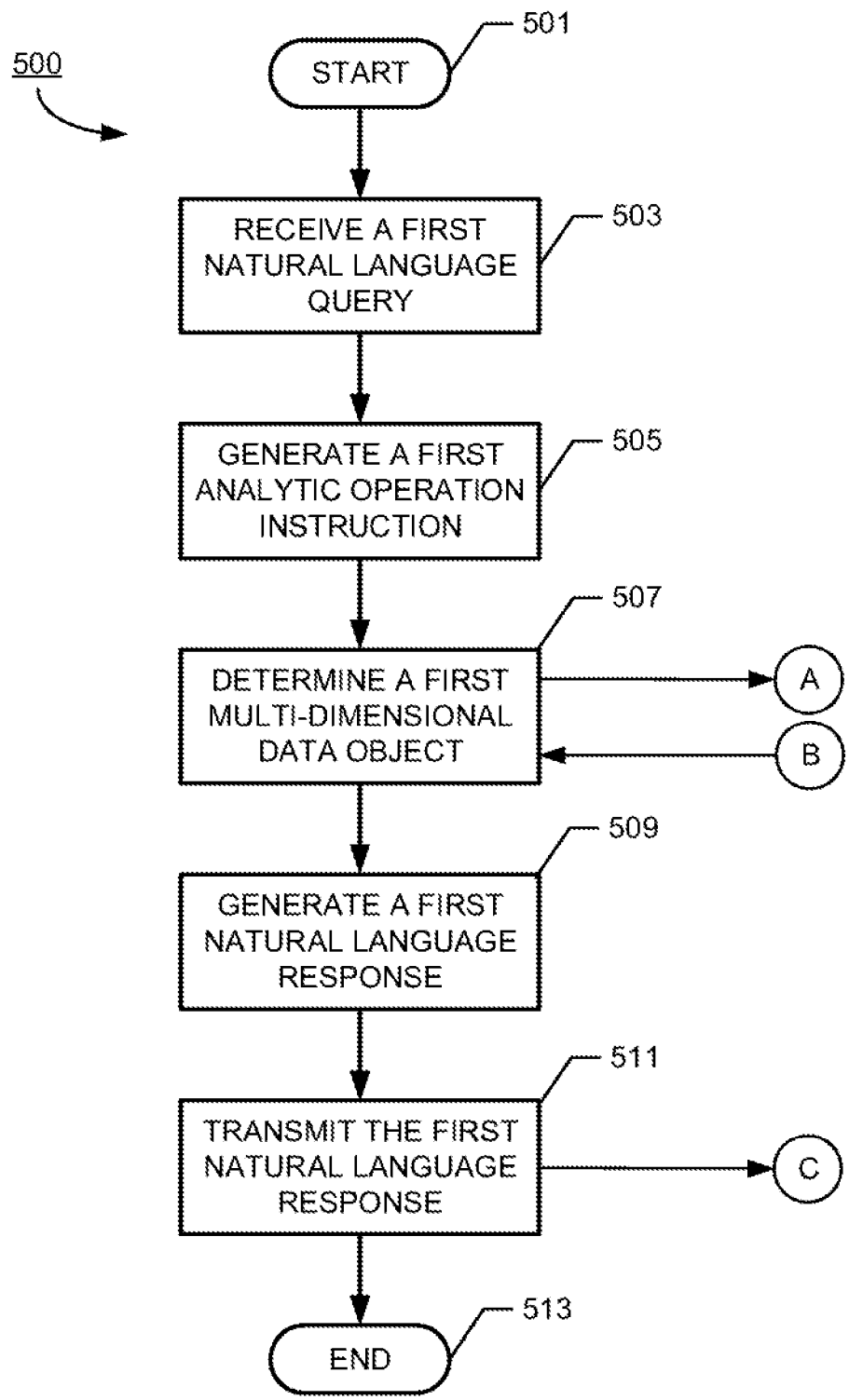
Figure 6:
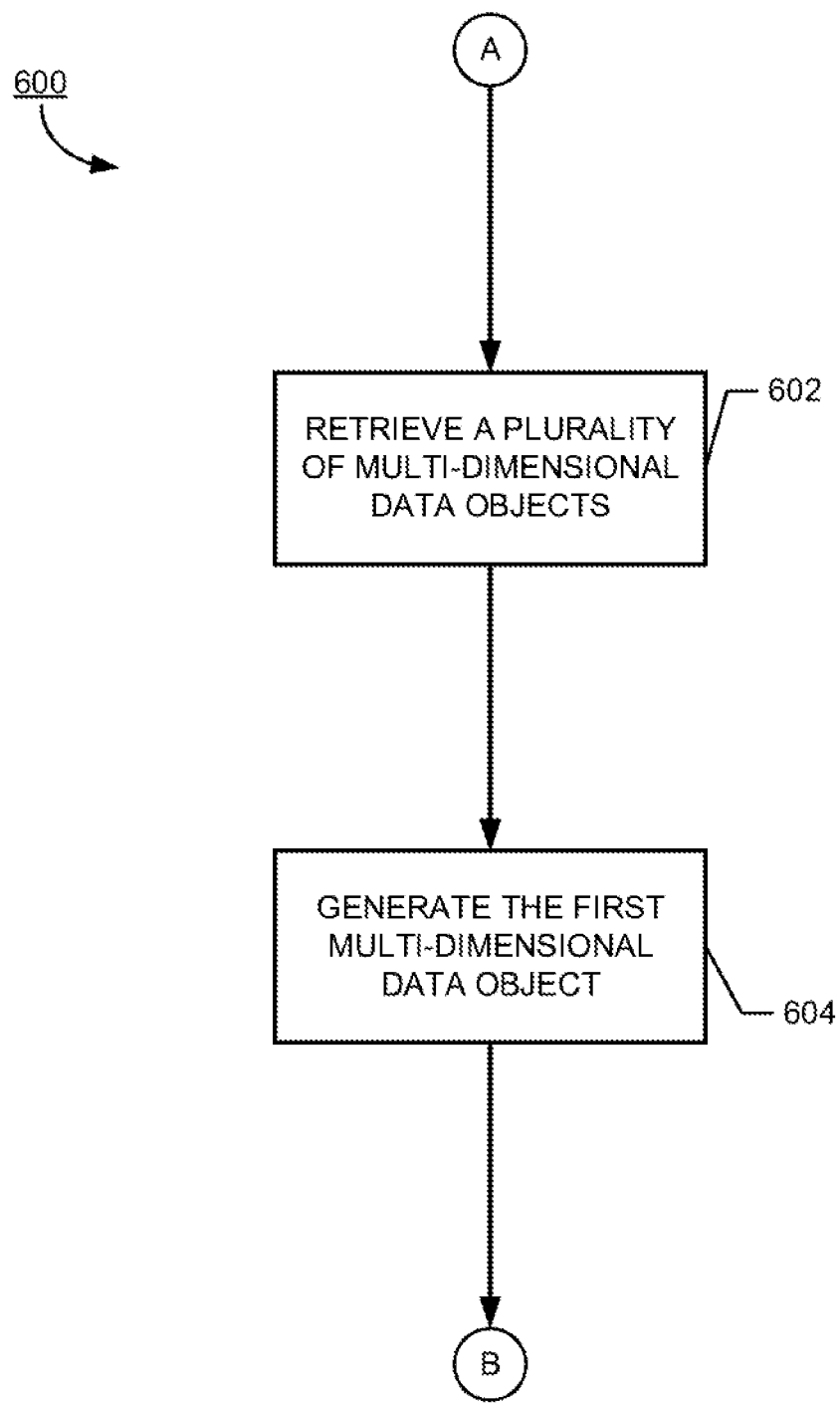
Figure 7:
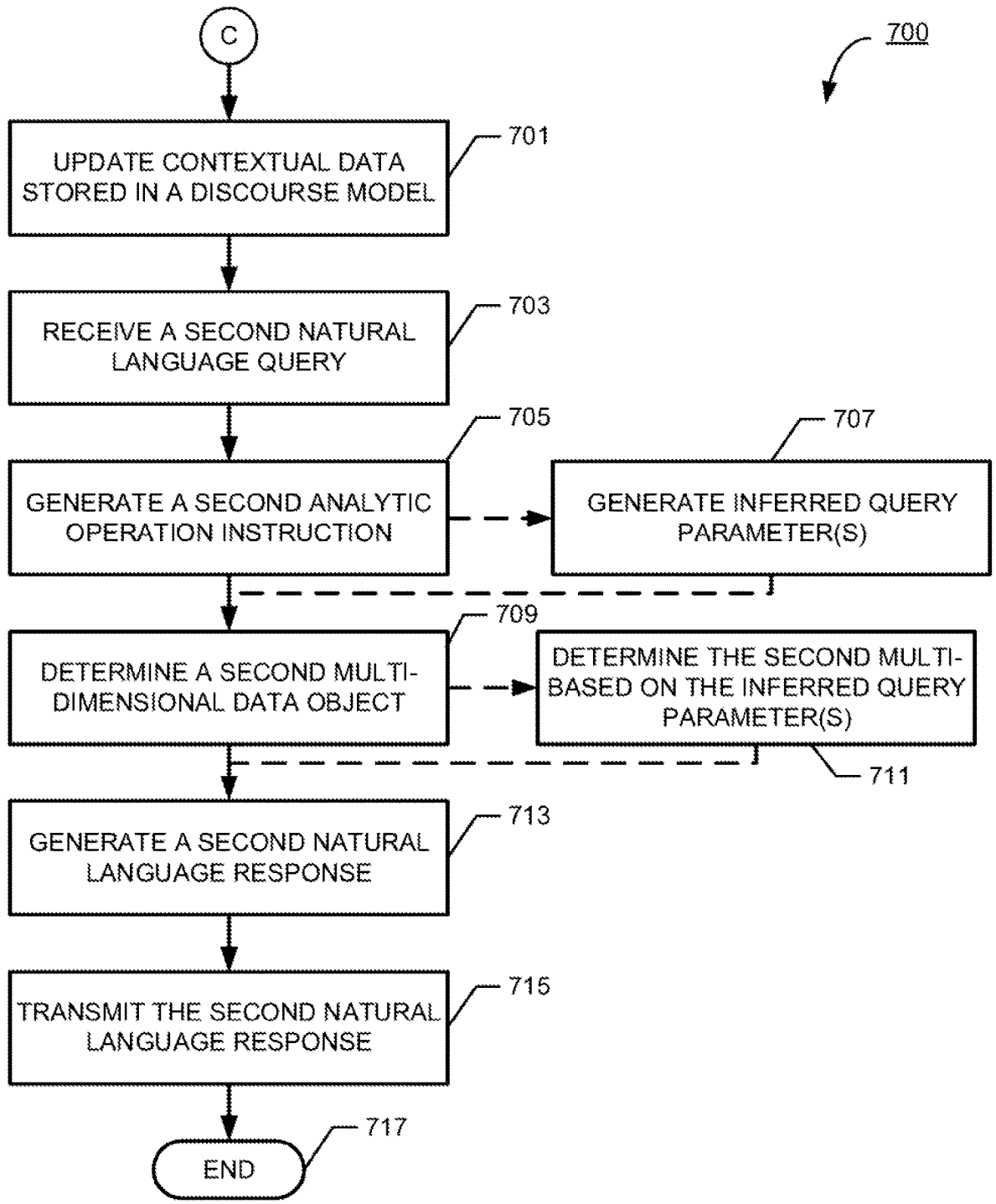

Having thus described some embodiments in general terms, references will now be made to the accompanying drawings, which are not necessarily drawn to scale, and wherein:

FIG. 1 is an example system architecture diagram illustrating a conversational language interaction environment in accordance with some embodiments of the present disclosure;

FIG. 2 is an example infrastructure diagram illustrating an example client device in accordance with some embodiments of the present disclosure;

FIG. 3 is an example infrastructure diagram illustrating an example conversational data-to-text system in accordance with some embodiments of the present disclosure;

FIG. 4 illustrates an example multi-dimensional data object in accordance with some embodiments of the present disclosure; and FIG. 5, FIG. 6, and FIG. 7 illustrate example methods in accordance with some embodiment of the present disclosure.

DETAILED DESCRIPTION OF VARIOUS EMBODIMENTS

Various embodiments of the present disclosure are described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

The term "comprising" means "including but not limited to," and should be interpreted in the manner it is typically used in the patent context. Use of broader terms such as "comprises," "includes," and "having" should be understood to provide support for narrower terms such as "consisting of," "consisting essentially of," and "comprised substantially of."

The phrases "in one embodiment," "according to one embodiment," "in some examples," "for example," and the like generally mean that the particular feature, structure, or characteristic following the phrase may be included in an embodiment of the present disclosure, and may be included in more than one embodiment of the present disclosure (importantly, such phrases do not necessarily refer to the same embodiment).

OVERVIEW

Various embodiments of the present disclosure relate generally to natural language query systems. More specifically, various embodiments of the present disclosure are related to a conversational data-to-text system that, in some examples, may resolve one or more tasks, engage in one or more extended conversations, and/or present insights derived from data (including multi-dimensional data objects) in the form of natural language response(s).

In the present disclosure, the terms "conversational system," "dialogue system," "conversational agents" refer to a computing system or device with which a human being (e.g., a user) may communicate, converse and/or interact. In some embodiments, communications, conversations and/or interactions between an example conversational system and a human being may be conducted in natural language (e.g. a language that has developed naturally in use such as English, Standard Mandarin, etc.). A dialogue system may be classified based on its objective(s) or goal(s). For example, a dialogue system may be a "task-orientated dialogue system," which may resolve one or more tasks and/or execute one or more actions after receiving instructions (in the form of natural language) from a user. For example, an example task-orientated dialogue system may provide driving directions to a user, changing setting(s) of Internet of Things (IOT) devices (such as smart thermostats) based on user's instructions, and/or the like. As another example, a dialogue system may be a "chatbot." A "chatbot" may engage in an extended conversation with a user (such as by mimicking an unstructured conversation or "chats" characteristic of human-human interactions).

In the present disclosure, the term "data-to-text system" refers to a computer system that may generate output data (such as, but not limited to, written texts, graphics, and/or the like) based on input data (including linguistic input and/or non-linguistic input) received from a user. For example, an example data-to-text system may analyze and interpret non-linguistic data received as input data, and may generate an output text by deriving insights from a dataset based on querying the dataset using the received non-linguistic data.

In the present disclosure, the term "conversational data-to-text system" refers a computing system that may combine various features and elements of dialogue systems (including task-orientated dialogue systems and chatbots) and data-to-text systems. In some examples, an example conversational data-to-text system may overcome many technical challenges associated dialogue systems and data-to-text systems.

For example, data-driven decision making may be fundamental to the success of many institutions and enterprises. A conversational data-to-text system may, in some examples, increase decision making efficiency by allowing users to verbally query for a specific insight, without having to read (or listen to) an entire report, by narrowing the gap between end users and data (such as by allowing non-technical users to use conversational natural language to query data).

In many examples, datasets that yield useful insights may be multi-dimensional. For example, data objects in an example dataset may be split or categorized based on countries, product type, quarters, etc. Analyzing multi-dimensional data can be a complex task, at least due to technical complexity in choosing one or more applicable operations from various possible query operations, such as, but not limited to, grouping (e.g. by country, product, quarter, etc.), filtering (e.g. for Canada, Coca-Cola, Q1, etc.), variance (e.g. Q1 vs Q2 sales, drivers and offsets, etc.). To accomplish such a complex task, an example conversational data-to-text system may, in some examples, programmatically extract insights from multi-dimensional datasets in natural language.

In addition, an example conversational data-to-text system in accordance with embodiments of the present disclosure may be multi-turn based instead of single-turn based. In the present disclosure, the term "single-turn based" refers to a system that generates a signal response (for example, a report) in response to a signal request or input from a user (for example, pressing a button). The term "multi-turn based" refers to a system that may generate a response (for example, an answer) in response to several requests or inputs from a user (for example, multiple questions received from a user). A multi-turn interaction provided by an example conversational data-to-text system may enable more flexibility in user interaction, as it allows users (such as analysts) to direct the insight harvesting process, rather than being constrained to the insights within a single-shot report.

Further, it may be challenging to produce a system that is generic enough to work with a large variety of datasets (such as within the business intelligence/natural language query (BI/NLQ) domain), in comparison with a system that is specific to a singular dataset or data source. An example conversational data-to-text system in accordance with examples of the present disclosure may retrieve datasets from multiple domains and/or in multi-dimensional format, such that the example conversational data-to-text system may be generic enough to answer a large variety of possible questions that cover a large number of possible datasets.

In addition to overcoming various technical challenges (such as those described above), an example conversational data-to-text system in accordance with embodiments of the present disclosure may provide various technical benefits.

Specifically, and by way of example, the example conversational data-to-text system disclosed herein is configured to enable conversation between a user and a dataset in the form of a question and answer exchange. In some examples, the conversation may begin with a question received from a user and is processed by way of a natural language understanding component (such as a query mapper) of the example conversational data-to-text system, whereas in others the conversation may begin based on an output of a response generator of the example conversational data-to-text system. In both cases, the response generator is configured to generate an output response in the form of such as, but not limited to, written text(s), which may be converted into audio data (such as, but not limited to, voice, sound, and/or the like) by the example conversational data-to-text system or by an example client device. In some examples, a user may continue the conversation by interacting with the output response, such as by way of a question, a query, by selecting an item in the text or the like. In such cases, the example conversational data-to-text system processes the question, the query, and/or the selection, and generates an output, thereby enabling, in some examples, an extended conversation between the conversational data-to-text system and the user.

By way of further example, various embodiments of the present disclosure may maintain a model of the current state of the conversation (e.g., a discourse model), such that a human being may communicate effectively with a conversational data-to-text system. The discourse model may be relied on by the conversational data-to-text system to both analyze dataset and generate output correctly and fluidly. In some embodiments, the discourse model may provide contextual information to the conversation and allow for features such as, but not limited to, using referring expressions, resolving underspecified entities, and occluding or omitting repeating information. In some embodiments, contextual information may come form not only the conversational history, but also relationships between data entities (e.g., an understanding that date entities may form a hierarchy). As such, an example conversational data-to-text system may analyze both types of contextual information in generating an output.

As another example, an example conversational data-to-text system in accordance with examples of the present disclosure may transform expressions in natural language text into formal meaning representations (e.g., "semantic frames") such that the conversational data-to-text system may properly extract and interpret a query from a user, analyze dataset, and properly generate text. In some embodiments, a temporal expression that denotes a temporal entity or time can be a complex entity to represent (e.g., dimension, extension, direction, granularity, etc.), and natural language may add several more layers of complexity (e.g., underspecification, elision, distance, etc.). An example conversational data-to-text system may comprise a semantic parser that may extract and interpret a temporal expression within a query received from a user, even if the query may not have contiguous words that would normally indicate a temporal expression, so that the temporal expression may be correctly and accurately transformed into semantic frames.

As such, various embodiments of the present disclosure may provide a conversational data-to-text system that may accomplish tasks of providing insights in natural language based on translating natural language queries into relevant data query operations (e.g. filtering, retrieving a mean, variance analysis, etc.), engaging in an extended conversation by answering multiple queries in succession and utilizing information from previous queries (if applicable), and/or being generic enough to handle a large variety of datasets from multiple domains.

Example System Architecture

FIG. 1 is an example block diagram of example components of an example conversational environment 100. In the example shown in FIG. 1, the conversational environment 100 may comprise various components, such as, but not limited to, one (or more) conversational data-to-text system 105, one or more client devices 101A, 101B, 101C, 101D, ... and one or more networks 103. In some embodiments, the conversational environment 100 may comprise one or more data storage devices (such as data storage devices 107A, 107B, ...).

Each of the example components of the example conversational environment 100 may be in electronic communication with, for example, one another over the same or different networks 103.

For example, users may communicate, converse and/or interact with the conversational data-to-text system 105 via one or more networks (such as one or more networks 103) using one or more client devices (such as client devices 101A, 101B, 101C, 101D, The client devices 101A, 101B, 101C, 101D, ... may be a computing device. For example, the client devices 101A, 101B, 101C, 101D may include desktop computers, laptop computers, tablet computers, smartphones, wearables, smart speakers, smart televisions, smart home appliances (including, but not limited to, smart refrigerators, smart washer, smart dryer), voice controllers, devices with integrated intelligent virtual assistant (IVA) or intelligent personal assistant (IPA), and/or the like. An example infrastructure diagram of an example client device is illustrated in FIG. 2 and described in detail herein.

In some embodiments, a user may communicate, converse and/or interact with the conversational data-to-text system 105 by providing voice, sound, and/or other types of audio data. For example, the client device 101A may comprise a microphone circuitry that may detect and/or capture audio data from the environment surrounding the client device 101A. The client device 101A may analyze audio data, convert applicable audio data to user query data, and transmit the user query data to the conversational data-to-text system 105.

In some embodiments, the client device 101A may analyze audio data to determine whether the use has triggered, requested, and/or prompted communication, conversation and/or interaction with the conversational data-to-text system 105. For example, by analyzing the audio data, the client device 101A may determine that a user has spoken a trigger word or phrase that indicates a request to communicate, converse and/or interact with the conversational data-to-text system 105. Subsequently, the client device 101A may convert the audio data into query data, and may transmit the query data to the conversational data-to-text system 105.

In some embodiments, a user may communicate, converse and/or interact with the conversational data-to-text system 105 by inputting text and/or other types of non-audio data to a client device. For example, the client device 101A may comprise an input/output circuitry (for example, a keyboard, a mouse, etc.) that may allow a user to provide non-audio data to the client device 101A (for example, by typing or selecting a request to communicate, converse and/or interact with the conversational data-to-text system 105). Based on the non-audio data, the client device 101A may generate user query data, and transmit the user query data to the conversational data-to-text system 105.

In some embodiments, communication, conversation and/or interaction between a user (via a client device) and the conversational data-to-text system 105 may be triggered, promoted, and/or directed based on one or more triggering events. For example, the client device may comprise one or more sensor circuitries, such as, but not limited to, one or more touch sensors, one or more accelerometers, one or more gyroscopes, one or more pressure sensors, one or more capacitive sensors and/or the like. As an example, the client device 101B may be in the form of a mobile device that comprises a physical button and a pressure sensor electronically coupled to the physical button. Based on detecting that a user has pressed the physical button for a time duration longer than a predetermined time period, the client device 101B may trigger a microphone circuitry to detect and/or capture audio data, and/or trigger an input/output circuitry to detect and/or capture non-audio data. Subsequently, the client device 101B may convert the audio data and/or non-audio data into user query data, and may transmit the user query data to the conversational data-to-text system 105.

While the description above provides some examples of initiating, triggering, and conducting communication, conversation, and/or interaction between a user and the conversational data-to-text system 105, it is noted that the scope of the present disclosure is not limited to the description above. In some examples, communication, conversation, and/or interaction may be initiated, triggered, and/or conducted additionally or alternatively through other means or mechanisms.

Referring back to FIG. 1, the one or more networks 103 may include, but are not limited to, any one or a combination of different types of suitable communications networks. Such networks may include, but not limited to, a wired or wireless local area network (LAN), personal area network (PAN), metropolitan area network (MAN), wide area network (WAN), or the like, as well as any hardware, software and/or firmware required to implement it (such as, e.g., network routers, etc.).

For example, one or more networks 103 may include an 802.11, 802.16, 802.20, and/or WiMax network. The one or more networks 103 may include medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof. The one or more networks 103 may include a public network (such as the Internet), a private network (such as an intranet), or combinations thereof, and may utilize a variety of networking protocols including, but not limited to, TCP/IP based networking protocols. As an example, the networking protocol may be customized to suit the needs of the conversational data-to-text system 105. In some embodiments, the protocol may be a custom protocol of JSON objects sent via a WebSocket channel. In some embodiments, the protocol may be JSON over RPC, JSON over REST/HTTP, and the like.

In some embodiments, data and/or information (such as, but not limited to, user query data) may be sent to the conversational data-to-text system 105 via, for example, the one or more networks 103 directly by one or more client devices 101A, 101B, 101C, 101D . . . . Additionally, or alternatively, these data and/or information may be sent to the conversational data-to-text system 105 by a client device and via one or more intermediaries (such as another client device).

In various embodiments of the present disclosure, the conversational data-to-text system 105 may comprise one or more hardware components (such as circuitries) and software components (such as software systems/modules) that may be configured to generate one or more output responses based on user query data received by the conversational data-to-text system 105 (for example, user query data that is generated by and transmitted from one or more client devices 101A, 101B, . . . ), additional details of which are described herein.

In the example shown in FIG. 1, the example conversational environment 100 may comprise one or more data storage devices (such as data storage devices 107A, 107B, . . . ) in electronic communications with the conversational data-to-text system 105. For example, the data storage device 107A may provide remote data sources (e.g. remote reference data, remote user data, and/or the like). The data storage device 107B may provide third-party data sources (for example, data stored in a database that is external to the conversational data-to-text system 105). Additionally, or alternatively, the example conversational environment 100 may comprise more (or less) data storage devices as compared to those shown in the example of FIG. 1.

In some embodiments, the conversational data-to-text system 105 may transmit one or more output responses to a client device (such as one of the one or more client devices 101A, 101B, 101C, 101D . . . ) through the one or more networks 103. Additionally, or alternatively, one or more output responses may be transmitted to a client device through the one or more networks 103 and via one or more intermediaries (such as another client device).

In some embodiments, subsequent to receiving the output response(s), a client device may convert the output response(s) into audio data, and may output the audio data through a speaker circuitry. Additionally, or alternatively, client device may convert the output response(s) into non-audio data (such as, but not limited to, written texts, graphics, and/or the like), and may render the non-audio data for display through a display circuitry.

As such, in various example embodiments of the present disclosure, communication, conversation, and/or interaction between a user and the conversational data-to-text system 105 may be initiated, triggered, and/or conducted based at least on the user providing audio data (for example, speaking into a client device) and/or non-audio data (for example, typing into the client device). The user may receive an output response from the conversational data-to-text system 105 (that may be converted into audio data and/or non-audio data as described above), and may continue the communication, conversation, and/or interaction by providing additional audio data and/or non-audio data (and receiving additional output responses from the conversational data-to-text system 105).

While the description above provides an example architecture of an example conversational environment, it is noted that the scope of the present disclosure is not limited to the description above. In some examples, an example conversational environment may comprise one or more additional and/or alternative elements. For example, while FIG. 1 illustrates certain devices as separate, standalone entities, the various embodiments of the present disclosure are not limited to this particular architecture.

Example Client Device

FIG. 2 provides an illustrative schematic representative of a client device 101A that can be used in conjunction with embodiments of the present disclosure.

In the example shown in FIG. 2, the client device 101A may include one or more components, such as, but not limited to, a processing circuitry 206, a storage circuitry 208, a communication interface circuitry 214.

In some embodiments, the client device 101A may optionally include a microphone circuitry 202 and an analog-to-digital converter (ADC) circuitry 204. In some embodiments, the client device 101A may optionally include a speaker circuitry 218 and a digital-to-analog converter (DAC) circuitry 216. In some embodiments, the client device 101A may optionally include an input/output circuitry 220. In some embodiments, the client device 101A may optionally include a sensor circuitry 222.

In embodiments where the client device 101A comprises the microphone circuitry 202, the microphone circuitry 202 may comprise one or more sensors, transducers, and/or signal detecting apparatuses that may be configured to detect and/or capture acoustic signal(s) (for example, acoustic waveform(s)) that represent audio data. Examples of the microphone circuitry 202 may include, but not limited to, a piezoelectric microphone, a micro-electrical-mechanical system (MEMS) microphone, a large diaphragm condenser microphone, a small diaphragm condenser microphone, a carbon microphone, a liquid microphone, an electret condenser microphone, a dynamic microphone, and/or the like. For example, the microphone circuitry 202 may detect acoustic signal(s) from the environment surrounding the client device 101A, which may include, for example, user's voice or sound made by a user.

In some embodiments, the microphone circuitry 202 may be electronically coupled to the ADC circuitry 204. The ADC circuitry 204 may convert acoustic signal(s) to digital signal(s). Examples of the ADC circuitry 204 may include, but not limited to, flash ADC, successive-approximation register ADC, and/or the like. For example, the ADC circuitry 204 may convert acoustic waveforms into audio data that can be processed by the processing circuitry 206.

While the description above provides an example of the microphone circuitry 202 being electronically coupled to the ADC circuitry 204, it is noted that the scope of the present disclosure is not limited to the description above. In some embodiments, the microphone circuitry 202 may comprise an integrated ADC circuitry within the microphone circuitry 202, such that a separate ADC circuitry is not required.

In the example shown in FIG. 2, the ADC circuitry 204 (or the microphone circuitry 202 having an integrated ADC circuitry) is electronically coupled to the processing circuitry 206, and may transmit audio data to the processing circuitry 206.

The processing circuitry 206 may be embodied in a number of different ways and may, for example, include one or more same or different processing devices configured to perform independently or jointly. For example, the processing circuitry 206 may be embodied as one or more complex programmable logic devices (CPLDs), microprocessors, multi-core processors, coprocessing entities, application-specific instruction-set processors (ASIPs), and/or controllers. Further, the processing circuitry 206 may be embodied as one or more other processing devices or circuitry. The term circuitry may refer to an entirely hardware embodiment or a combination of hardware and computer program products. Thus, the processing circuitry 206 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing circuitry 206 may be configured for a particular use or configured to execute instructions stored in one or more storage circuitries (such as, but not limited to, one or more memories, one or more volatile or non-volatile computer-readable storage mediums and/or one or more data repositories that are accessible to the processing circuitry 206). As such, whether configured by hardware or computer program products, or by a combination thereof, the processing circuitry 206 may be capable of performing steps or operations according to embodiments of the present disclosure when configured accordingly. In some embodiments, the processing circuitry 206 may include one or more processors configured in tandem via a bus to enable independent execution of instructions, pipelining, and/or multi-threading. The use of the term "processing circuitry" may be understood to include a single core processor, a multi-core processor, multiple processors internal to the apparatus, and/or remote or "cloud" processors.

Referring to FIG. 2, the processing circuitry 206 may be electronically coupled to the storage circuitry 208, such that the processing circuitry 206 may be configured to execute instructions stored in the storage circuitry 208.

The storage circuitry 208 may be embodied in a number of different ways and may, for example, include one or more same or different data storage devices configured to perform independently or jointly. For example, the storage circuitry 208 may comprise one or more volatile computer-readable storage mediums. In some embodiments, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like.

Additionally, or alternatively, the storage circuitry 208 may comprise one or more non-volatile computer-readable storage mediums. In some embodiments, a non-volatile computer-readable storage medium may include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like. Additionally, or alternatively, a non-volatile computer-readable storage medium may include compact disc read only memory (CD-ROM), compact disc-rewritable (CD-RW), digital versatile disc (DVD), Blu-ray disc (BD), any other non-transitory optical medium, and/or the like. Additionally, or alternatively, a non-volatile computer-readable storage medium may include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Additionally, or alternatively, a non-volatile computer-readable storage medium may include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

It will be appreciated that, where embodiments are described to use a computer-readable storage medium, other types of computer-readable storage media may be substituted for or used in addition to the computer-readable storage media described above.

In accordance with various embodiments of the present disclosure, one or more computer program products may be installed and/or stored in a storage circuitry. Example computer program products may include, but not limited to, software components such as one or more software components, applications, software objects, methods, data structures, and/or the like.

In the present disclosure, a software component may be coded in any of a variety of programming languages. An illustrative programming language may be a lower-level programming language such as an assembly language associated with a particular hardware architecture and/or operating system platform/system. A software component comprising assembly language instructions may require conversion into executable machine code by an assembler prior to execution by the hardware architecture and/or platform/system. Another example programming language may be a higher-level programming language that may be portable across multiple architectures. A software component comprising higher-level programming language instructions may require conversion to an intermediate representation by an interpreter or a compiler prior to execution. Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

In the example shown in FIG. 2, a voice recognition component 210 and/or a trigger detection component 212 may be stored in the storage circuitry 208. In some embodiments, the voice recognition component 210 may comprise one or more software components that are configured to determine whether audio data (for example, received from the microphone circuitry 202 and/or the ADC circuitry 204) comprises data/information that represents a human voice, and/or the identity of the voice (i.e. whom the voice is originated from). For example, the voice recognition component 210 may comprise algorithms, such as, but not limited to, classification-based algorithms (e.g. algorithms based on Mel frequency cepstral coefficients (MFCC) and/or linear prediction cepstral coefficients (LPCC)). Additionally, or alternatively, the voice recognition component 210 may implement one or more machine learning models, such as, but not limited to, artificial neural network (ANN), vector quantization (VQ), and/or dynamic time warping (DTW).

If the voice recognition component 210 determines that the audio data comprises data/information that represents a human voice, and/or the identity of the voice corresponds to an authorized user of the client device 101A, the voice recognition component 210 may transmit the audio data to the trigger detection component 212. The trigger detection component 212 may comprise one or more software components that are configured to determine whether the audio data comprises data/information that represents a trigger word, a trigger phrase, a trigger sentence, and/or a trigger audio sequence that indicates a user's request to communicate, converse and/or interact with a conversational data-to-text system (for example, the conversational data-to-text system 105 shown above in connection with FIG. 1). For example, the voice recognition component 210 may comprise machine learning algorithms, such as, but not limited to, deep neural network (DNN). As an example, the DNN may calculate a plurality of trigger scores based on the audio data and determine whether these trigger scores satisfy one or more threshold values and/or conditions. Based on one or more of the plurality of trigger scores satisfying the one or more threshold values and/or conditions, the trigger detection component 212 may determine that the audio data comprises data/information that represents a trigger word, a trigger phrase, a trigger sentence, and/or a trigger audio sequence.

Based on determining that the audio data comprises data/information indicating a user's request to communicate, converse and/or interact with a conversational data-to-text system, the processing circuitry 206, in communication with the storage circuitry 208, may convert the audio data into user query data, and cause the communication interface circuitry 214 to transmit the user query data to a conversational data-to-text system (for example, the conversational data-to-text system 105). For example, the processing circuitry 206 may execute one or more algorithms and/or models that may convert and/or translate audio data into user query data in the form of text (for example, a speech-to-text algorithm that converts an audio recording to a natural language expression that corresponds to text of the audio recording). For example, the processing circuitry 206 may execute an algorithm based on the Hidden Markov Models (HMM)s. In such an example, the HMMs may model time-varying spectral vector sequences based on the audio data. Additionally, or alternatively, the processing circuitry 206 may generate text using other algorithms and/or models, such as, but not limited to, machine learning models (e.g. ANN, VQ, DTW, and/or the like).

Based on determining that the audio data comprises data/information not indicating a user's request to communicate, converse and/or interact with a conversational data-to-text system, the processing circuitry 206, in communication with the storage circuitry 208, may discard or delete the audio data.

While the description above provides some example software modules stored in the storage circuitry 208, it is noted that the scope of the present disclosure is not limited to the description above. In some examples, an example storage circuitry 208 may comprise one or more additional and/or alternative software modules.

Further, while the description above provides an example of a user triggering, requesting, and/or conducting communication, conversation and/or interaction with an example conversational data-to-text system through audio, it is noted that the scope of the present disclosure is not limited to this example only. Additionally, or alternatively, a user may trigger, request, and/or conduct communication, conversation and/or interaction with the conversational data-to-text system 105 through non-audio means.

For example, in some embodiments of the present disclosure, the client device 101A may include an input/output circuitry 220. Examples of input/output circuitry 220 may include, but is not limited to, a display circuitry (including, but is not limited to, a cathode ray tube (CRT) display, a liquid crystal display LCD (LCD), a Light-emitting diode (LED) display, an organic light-emitting diode (OLED) display, a quantum light-emitting diode (QLED) display, a mini-LED display, and/or the like), a keyboard circuitry, a mouse circuitry, and/or the like. For example, the input/output circuitry 220 may be configured to provide an application, browser, user interface, dashboard, webpage, and/or the like that are executed on and/or accessible via the client device 101A to cause display of information/data and for user interaction therewith via one or more user input interfaces. The input/output circuitry 220 may comprise any of a number of devices allowing the client device 101A to receive data, such as a keypad (hard or soft), a keyboard, a touch display, motion interfaces, scanners, readers, or other input device. In embodiments including a keypad, the keypad can include (or cause display of) the conventional numeric (0-9) and related keys (#, *), and other keys used for operating the client device 101A and may include a full set of alphabetic keys or set of keys that may be activated to provide a full set of alphanumeric keys.

For example, the user may provide user input data in the form of non-audio data to the client device via a keyboard and/or a mouse. The processing circuitry 206 may analyze the non-audio data, and determine that the non-audio data comprise the user's request to communicate, converse and/or interact with a conversational data-to-text system (for example, the conversational data-to-text system 150). Accordingly, the processing circuitry 206 may convert the non-audio data to user query data, and may transmit the user query data to a conversational data-to-text system (for example, the conversational data-to-text system 150).

Additionally, or alternatively, the client device 101A may comprise a sensor circuitry 222. Examples of the sensor circuitry 222 may include, but is not limited to, a touch sensor, an accelerometer, a gyroscope, a pressure sensor, a capacitive sensor, a proximity sensor, an ambient light sensor, and/or the like. As described above, the sensor circuitry 222 may be configured to detect one or more triggering events (for example, a user has pressed the physical button for a time duration longer than a predetermined time period) as indicating a user's request to communicate, converse and/or interact with a conversational data-to-text system (for example, the conversational data-to-text system 150). Subsequent to detecting the one or more triggering events, the processing circuitry 206 may convert audio data (generated by the microphone circuitry 202 and/or the ADC circuitry 204) and/or non-audio data (generated by the input/output circuitry 220) into user query data, and transmit the user query data to the communication interface circuitry 214.

In some embodiments, the communication interface circuitry 214 may communicate with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. For example, the communication interface circuitry 214 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The conversational data-to-text system 105 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

For example, the communication interface circuitry 214 may transmit user query data to a conversational data-to-text system (for example, the conversational data-to-text system 105), and may receive data, content, and/or information (such as output responses) from the conversational data-to-text system (for example, the conversational data-to-text system 105). Subsequently, the communication interface circuitry 214 may communicate such data, content, and/or information with the processing circuitry 206.

In embodiments where the client device 101A comprises the speaker circuitry 218 (and the DAC circuitry 216), the processing circuitry 206 may execute one or more algorithms and/or models that may convert and/or translate output responses into audio data (e.g., a text-to-speech algorithm that converts texts into audio). For example, the processing circuitry 206 may execute one or more speech synthesis modules stored in the storage circuitry 208 to convert the output response into audio data, and may transmit the audio data to the speaker circuitry 218 (or the DAC circuitry 216).

In some embodiments, the DAC circuitry 216 may convert audio data to acoustic signal(s) (for example, acoustic waveform(s)). In some embodiments, the DAC circuitry 216 may be electronically coupled to the speaker circuitry 218. In some embodiments, the speaker circuitry 218 may comprise an integrated DAC circuitry within the speaker circuitry 218, such that a separate DAC circuitry is not required.

In some embodiments, the speaker circuitry 218 may be configured to output acoustic signals (for example, acoustic waveforms). Examples of the speaker circuitry 218 may include, but not limited to, moving-iron speakers, piezoelectric speakers, electrostatic loudspeakers, and/or the like.

While the description above provides an example of presenting output responses generated by an example conversational data-to-text system through audio means, it is noted that the scope of the present disclosure is not limited to this example only. Additionally, or alternatively, output responses generated by an example conversational data-to-text system may be presented to a user through non-audio means.

For example, as described above, an example input/output circuitry 220 may comprise a display circuitry. In some embodiments, the processing circuitry 206 may cause the output responses rendered for display through the display circuitry.

As such, in various example embodiments of the present disclosure, a user may communicate, converse and/or interact with an example conversational data-to-text system via the client device 101A through audio means (for example, through the microphone circuitry 202 and/or the speaker circuitry 218) and/or non-audio means (for example, through the input/output circuitry 220). The client device 101A may generate and transmit user query data to a conversational data-to-text system, and the conversational data-to-text system may generate and transmit output responses to the client device 101A.

Example Conversational Data-to-Text System

FIG. 3 provides an illustrative schematic representative of an example conversational data-to-text system 105 that can be used in conjunction with embodiments of the present disclosure.

In the example shown in FIG. 3, the conversational data-to-text system 105 may include one or more components, such as, but is not limited to, one or more of a processing circuitry 301, a storage circuitry 303, and a communication interface circuitry 305. In some embodiments, the conversational data-to-text system 105 may optionally include an input/output circuitry 307.

In some embodiments, the processing circuitry 301 may be embodied in a number of different ways and may, for example, include one or more same or different processing devices configured to perform independently or jointly. In some embodiments, the processing circuitry 301 may be similar to the processing circuitry 206 described above in connection with FIG. 2.

In some embodiments, the communication interface circuitry 305 may communicate with various computing entities, such as by communicating data, content, information. In some embodiments, the communication interface circuitry 305 may be similar to the communication interface circuitry 214 described above in connection with FIG. 2.

In some embodiments, the input/output circuitry 307 may include a display circuitry, a keyboard circuitry, a mouse circuitry, and/or the like. In some embodiments, the input/ output circuitry 307 may be similar to the input/output circuitry 220 described above in connection with FIG. 2.

In some embodiments, the storage circuitry 303 may be embodied in a number of different ways and may, for example, include one or more same or different data storage devices configured to perform independently or jointly, similar to those described above in connection with FIG. 2. In accordance with various embodiments of the present disclosure, one or more computer program products may be installed and/or stored in the storage circuitry 303.

In the example shown in FIG. 3, the storage circuitry 303 may store computer program products that include one or more of a semantic parser 325, a grammar database 324, a dimensional data model 309, a multi-dimensional database 314, a discourse model 327, and/or a response generator 329.

In some embodiments, subsequent to receiving user query data from a client device, the processing circuitry 301 may execute the semantic parser 325 to extract and interpret semantic information from the user query data. For example, the semantic parser 325 may convert user query data (for example, natural langue expressions) into sematic frames so that other modules and/or components (such as the dimensional data model 309) may query data based on the semantic frames.

In the present disclosure, the term "semantic frame" refers to a structural representation of sematic information associated with one or more expressions. For example, a semantic frame may represent temporal relationships described in one or more expressions.

As an example, an example user query data provided to the semantic parser 325 may comprise the following temporal expression:

"from 2017 to 2019"

Subsequent to receiving the user query data, the semantic parser 325 may extract the above temporal expression from the user query data, and may convert the temporal expression into the following sematic frame:

{time_interval: {start: {year: 2017}, end: {year: 2019}}}

Subsequently, the semantic parser 325 may provide the sematic frame to other modules and/or components (such as the dimensional data model 309), so that the conversational data-to-text system 105 may generate an output response based at least in part on the temporal expression in the user query data.

In some embodiments, the semantic parser 325 may comprise various algorithms. For example, the semantic parser 325 may comprise an extraction algorithm that identifies parts of the user query data (for example, an expression in natural language) that constitute one or more particular semantic feature (for example, time) and generates a parse tree. The parse tree may be an interim data frame that contains semantic information (e.g. points, intervals) as well as syntactic information (e.g. word order). In some embodiments, the semantic parser 325 may comprise an interpretation algorithm. The interpretation algorithm may receive the parse tree as an input, in conjunction with contextual information (e.g. the current time), and generates a semantic frame, which may be sent to and used by, for example, the dimensional data model 309.

In some embodiments, when executing the extraction algorithm and/or the interpretation algorithm of the semantic parser 325, the processing circuitry 301 may be configured to retrieve one or more grammar templates from the grammar database 324.

In the present disclosure, the term "grammar template" refers to a data object that defines a grammar structure of an expression (for example, a text string) associated with the expression. For example, grammar templates may define a grammar structure associated with an expression that indicates a time point, a grammar structure associated with an expression that indicates a time interval, and/or a grammar structure associated with an expression that indicates a variance period. In some embodiments, an example grammar template may additionally or alternative define a phrasal category (for example, noun phrases, pronouns, etc.) associated with each word or phase in an expression.

In some embodiments, a grammar template may be a "context-free grammar." The term context-free grammar refers to a set of recursive rules that may be implemented to generate one or more parse trees based on the grammar structure. In the present disclosure, the term "parse tree" refers to a data object in the form of an ordered tree structure comprising a root, nodes, and branches. For example, a node of the parse tree may represent a time point, a time interval, a variance period, etc. In some embodiments, an example parse tree may represent the syntactic structure of a text string according to a context-free grammar.

In some embodiments, the grammar database 324 may store a plurality of grammar templates. In some embodiments, one or more grammar templates may be created by a user (for example, an operator of conversational data-to-text system 105). In some embodiments, one or more grammar templates may be programmatically created (for example, by implementing one or more machine learning models). As such, the grammar database 324 is user expandable, user configurable, and/or scalable.

Referring back to FIG. 3, in some embodiments, the semantic parser 325 may provide semantic frames to the dimensional data model 309. In some embodiments, based on the semantic frames, the dimensional data model 309 may retrieve one or more multi-dimensional data objects from the multi-dimensional database 314.

In the present disclosure, the term "data object" refers to a data structure that represents one or more functionalities and/or characteristics associated with data and/or information. The term "multi-dimensional data object" refers to a data object that may model, represent, and/or view data in a multi-dimensional structure (for example, a three-dimensional data cube). The term "multi-dimensional dataset" refers to a collection of one or more multi-dimensional data objects.

In some embodiments, a multi-dimensional data object may be placed in a feature space. The feature space may have a corresponding measure, which represents the numerical data that the multi-dimensional data object represents (for example, sales data, profit data, etc.). The feature space may comprise one or more dimensions, and each dimension may correspond to categorical data.

The placement or location of a multi-dimensional data object in a feature space may be based on one or more dimension names (e.g. one or more categories such as product, country, segment, year, quarter, etc.) of the multi-dimensional data object and one or more dimension instances (e.g. an instance of each dimension such as U.S., U.K., France, Q1, etc.) of the multi-dimensional data object.

Referring now to FIG. 4, an example multi-dimensional data object 402 in an example feature space 400 is shown. In the example shown in FIG. 4, the feature space 400 may comprise three dimensions: X, Y, and Z. Each dimension may represent a category associated with the multi-dimensional data object 402. To determine the dimension instance for each dimension, the multi-dimensional data object 402 may be projected to one or more planes of the feature space 400.

For example, to determine the dimension instance A of the multi-dimensional data object 402 in the dimension X, the multi-dimensional data object 402 may be projected to the plane X-Z (shown as projection 408) or to the plane X-Y (shown as projection 404). To determine the dimension instance B of the multi-dimensional data object 402 in the dimension Y, the multi-dimensional data object 402 may be projected to the plane X-Y (shown as projection 404) or to the plane Y-Z (shown as projection 406). To determine the dimension instance C of the multi-dimensional data object 402 in the dimension Z, the multi-dimensional data object 402 may be projected to the plane X-Z (shown as projection 408) or to the plane Y-Z (shown as projection 406).

As an example, the feature space 400 may represent sales data. The X dimension may represent the country category, the Y dimension may indicate the time category, and the Z dimension may represent the product category. In this example, the multi-dimensional data object 402 may represent the sales data of a given product in a given country at a given time. For example, if A indicates France, B indicates July, and C indicates Nutrali, the multi-dimensional data object 402 may represent the sales data of Nutrali in France in July.

Referring back to FIG. 3, in some embodiments, the dimensional data model 306 may analyze the semantic frames generated by the semantic parser 325 to determine an expected structure of the multi-dimensional data object and analytic query to be performed on the multi-dimensional data object.

In the example shown in FIG. 3, the dimensional data model 306 comprises a query mapper 311 and an analytics operator 312. The query mapper 311 may determine the type of queries and parameters of these queries in the user query data (as represented by the semantic frames). In some embodiments, the query mapper 311 may further determine applicable data analytic operation (such as filtering, grouping, variance, etc.) to be performed on the multi-dimensional data object(s) to derive insight. In some embodiments, the analytics operator 312 may validate the applicable data analytic operation determined by the query mapper 311 as well as the type of queries and parameters of the queries determined the query mapper 311. that is, the analytics operator 312 determines whether the data analytic operation as well as the queries selected by the query mapper 311 are valid given the user query data.

In some embodiments, the query mapper 311 may also determine the relevant narrative function for generating an output response. For example, when a query is mapped to an intent by the query mapper 311, the analytics operator 312 and the corresponding narrative function script are determined.

For example, the dimensional data model 309 may receive semantic frames representing the following user query data:

$1^{st}$ User Query: How are the sales of Nutrali in France for July?

In this example, the query mapper 311 may identify a filtering query in the user query data, and may identify the following parameters to the filtering query:
measure=sales
product=Nutrali
country=France
month=July Based on these parameters, the query mapper 311 may filter a feature space and locate a multi-dimensional data object that corresponds to the sales of Nutrali in France for July. Additionally, the analytics operator 312 may perform data analytic operations on the multi-dimensional data object to yield insights.

In the example shown in FIG. 3, the discourse model 327 may assist the query mapper 311 in determining types of queries and parameters for these queries based on the contextual data (or contextual information). Given the conversational aspect of the conversational data-to-text system, in some examples, not all queries and parameters are explicitly supplied by the user query data. In such examples, the discourse model 327 may fill in the gaps left by the user query data, infer information such as, but not limited to, higher levels of granularity of temporal expressions, previously uttered entities (dimensions, instances, measures), whether by the user or the system, an/or the like.

For example, the conversational data-to-text system 105 may receive the following $1^{st}$ user query and generate the $1^{st}$ system response. The conversational data-to-text system 105 may then receive the following $2^{nd}$ user query:

$1^{st}$ User Query: How are Sales of Nutrali in France for July?

$1^{st}$ System Response: In July 2020, sales of Nutrali in France are USD 1.2 million.

$2^{nd}$ User Query: How about in Germany?

In the above example, the dimensional data model 309 may only be able to construct a very impoverished query object (where country=Germany). The discourse model 327 may fill in various parameters for the query based on the contextual information, so the entire query becomes:
measure=sales
product=Nutrali
country=Germany
month=July
year=2020

As such, the discourse model 327 may interpret and/or understand how sentences or utterances are related and ordered. For example, the discourse model 327 may generate contextual information that represent relationships between semantic frames used to model the user query data and/or relationships between entities that are present in the multi-dimensional data. Such contextual information may include information about each entity (i.e. relationships to other entities) and its properties in the discourse (i.e. the last point of mentioning in the conversation).

In some embodiments, the discourse model 327 may make corrections (for example, when the conversational data-to-text system 105 has misinterpreted the user's intent), use referring expressions (such as pronouns "they" or "that"), and/or infer underspecified information in the dialogue. By incorporating the discourse model 327, the conversational data-to-text system 105 may produce fluid and coherent answers without unnecessarily repeating information more than once in a multi-turn conversation dialogue, may use a strategy of implicit confirmation to alert users to new information in the answer, and/or may use referring expressions instead of full entity names.

Referring back to FIG. 3, the dimensional data model 309 may provide the multi-dimensional data object retrieved from the multi-dimensional database 314 to the response generator 329. The response generator 329 may be configured to generate a response output based on the retrieved multi-dimensional data object.

In some examples, the response generator 329 may select a matching narrative function script for the multi-dimensional data object from a script database. In the present disclosure, the term "narrative function script" refers to one or more algorithms for generating an output response in natural language based on a natural language query and/or one or more data objects (for example, one or more multi-dimensional data objects). For example, a narrative function script may define a template for generating a narrative based on an intent associated with natural language query (such as, but not limited to, filtering, grouping, variance, and/or the like). In such examples, the response generator 329 may generate the response output based on the selected multi-dimensional data object and the matching narrative function script, details of which are described herein.

In some embodiments, the response output generated by the response generator 329 may be provided to the discourse model 327, such that the discourse model 327 may update contextual information.

In some embodiments, the response output generated by the response generator 329 may be provided to the communication interface circuitry 305, which may transmit the response output to a client device (for example, one or more of client devices 101A, 101B, . . . as described above). Subsequently, the client device may present the response output to a user through, for example, audio and/or non-audio means as described above.

While the description above provides examples of generating a natural language response regarding sales data, it is noted that scope of the present disclosure is not limited to this example only. In some embodiments, various examples of the present disclosure may provide one or more natural language response in other topic(s), such that various embodiments of the present disclosure are not topic specific.

Example Methods

Various methods described herein, including, for example, example methods as shown in FIG. 5, FIG. 6, and FIG. 7 provide a conversational data-to-text system. For example, the example methods as shown in FIG. 5, FIG. 6, and FIG. 7 may be executed by a processing circuitry discussed above in connection with FIG. 3.

It is noted that each block of the flowchart, and combinations of blocks in the flowchart, may be implemented by various means such as hardware, firmware, circuitry and/or other devices associated with execution of software including one or more computer program instructions. For example, one or more of the procedures described in FIG. 5, FIG. 6, and FIG. 7 may be embodied by computer program instructions, which may be stored by a non-transitory memory of an apparatus employing an embodiment of the present disclosure and executed by a processor in the apparatus. These computer program instructions may direct a computer or other programmable apparatus to function in a particular manner, such that the instructions stored in the computer-readable storage memory produce an article of manufacture, the execution of which implements the function specified in the flowchart block(s).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

As described above, various example embodiments of the present disclosure are related to providing a conversational data-to-text system that may understand and converse with a user in natural language, and may infer context information from the conversation with the user in generating a natural language response to a natural language query received from a user. The conversational data-to-text system in accordance with various example embodiments of the present disclosure may be able to derive insights from structured data (such as multi-dimensional data objects) and may require minimal configuration.

Embodiments herein further provide for suggestions by the system to the user for possible queries the user may request based on insights derived from the structured data. That is, whether or not a user has requested a valid query, the system may suggest possible valid queries in response to identifying a data set based upon which the user is requesting insights or information.

In the present disclosure, the term "natural language query" refers to a data object that represents a query from a user in natural language. The term "natural language response" refers to a data object that represents a response to a query that is generated by a conversational data-to-text system and in natural language.

For example, the following query-response exchange illustrates an example conversation between a user and a conversational data-to-text system in accordance with various example embodiments of the present disclosure:

Frist Natural Language Query: How are Sales of Nutrali in France for July?

Frist Natural Language Response: In July 2020, sales of Nutrali in France are USD 1.2 million.

Second Natural Language Query: How about in Germany?

Second Natural Language Response: In July 2020, sales of Nutrali in Germany are USD 1.7 million.

As shown in the example above, all interactions between the user and the conversational data-to-text system (including queries and responses) are natural language based. These interactions are not isolated, as the second natural language query builds on the first natural language query. In other words, not all information for data analysis is present in the natural language query. In the first natural language query, the year 2020 was not provided; it was inferred by the conversational data-to-text system from the context (e.g. the current time). In the second natural language query, "July 2020," "Nutrali" and "sales" were not provided; the conversational data-to-text system use its discourse model to infer these information, details of which are described herein.

In some embodiments, the conversational data-to-text system may map the natural language queries to complex structures (for example, a multi-dimensional structure) and instruct the system how to analyze (or query) the data. The natural language response reflects the analysis of the data and is not just random words, details of which are described herein.

FIG. 5, FIG. 6, and FIG. 7 illustrate example methods and operations associated with conversational data-to-text systems in accordance with example embodiments of the present disclosure.

Referring now to FIG. 5, an example method 500 is illustrated. In particular, the method 500 illustrated in FIG. 5 may describe example embodiments of generating natural language responses by an example conversational data-to-text system in response to a natural language query received from a user.

As shown in FIG. 5, the example method 500 starts at block 501 and then proceeds to step/operation 503. At step/operation 503, a processing circuitry (such as the processing circuitry 301 of the conversational data-to-text system 105 described above in connection with FIG. 1 and FIG. 2) may receive a first natural language query.

In some embodiments, the first natural language query may be received from a client device. For example, referring back to FIG. 2, a user of the client device 101A may speak into the microphone circuitry 202 and askes the following question:

How are Sales of Nutrali in France for July?

As described above, the client device 101A may convert the audio information into a natural language query (for example, through a speech-to-text algorithm that generates a string of text corresponding to the user's question). The client device 101A may transmit the natural language query to a conversational data-to-text system (for example, the conversational data-to-text system 105 shown in FIG. 3), and the conversational data-to-text system may receive the natural language query.

Referring back to FIG. 5, subsequent to step/operation 503, the method 500 may proceed to step/operation 505. At step/operation 505, a processing circuitry (such as the processing circuitry 301 of the conversational data-to-text system 105 described above in connection with FIG. 1 and FIG. 2) may generate a first analytic operation instruction.

In the present disclosure, the term "analytic operation instruction" refers to a data object that provides commands, directives, and/or specifications for conducting data analytic operations on another data object or a dataset.

In some embodiments, an analytic operation instruction may define at least one query parameter and at least one analytic operation type. In the present disclosure, the term "analytic operation type" refers to a category of analytic operation. Examples of analytic operation types may include, but is not limited to, filtering operations, grouping operations, variance operations, and/or the like. In the present disclosure, the term "query parameter" refers to a parameter or variable associated with an analytic operation. For example, if the analytic operation type is filtering operation, the corresponding query parameter may define one or more categories for conducting the filtering operation.

In some embodiments, the processing circuitry may generate the first analytic operation instruction based at least in part on the first natural language query. For example, the processing circuitry may execute a dimensional data model stored in a storage circuitry (such as the dimensional data model 309 described and illustrated above in connection with FIG. 3) and provide the first natural language query as an input to generate the first analytic operation instruction.

In the example shown in FIG. 3, the dimensional data model 309 may comprise the query mapper 311 and the analytics operator 312.

In some embodiments, the processing circuitry may execute the query mapper 311 of the dimensional data model 309 to identify at least one query parameter from the first natural language query. As an example, when executing the query mapper 311, the processing circuitry may receive semantic frames corresponding to the first natural language query from the semantic parser 325, which may provide structural representations of sematic information associated with the first natural language query.

Continuing from the first natural language query example:
Frist Natural Language Query: How are Sales of Nutrali in France for July? Based on the sematic information associated with the first natural language query, the processing circuitry, while executing the query mapper 311, may identify the following query parameters:
product=Nutrali
country=France
month=July In some embodiments, the processing circuitry, while executing the query mapper 311, may infer one or more additional query parameters. For example, the query mapper 311 may maintain a current time descriptor that indicates a current system time and date. Based on the current time descriptor indicating that the current year is 2020, the processing circuitry, while executing the query mapper 311, may infer the following query parameter from the first natural language query:
year=2020

In some embodiments, the at least one query parameter may also identify one or more data object(s) and/or dataset(s) associated with the first analytic operation instruction. For example, based on the sematic information associated with the first natural language query, the processing circuitry, while executing the query mapper 311, may generate a query parameter that indicates the type of data that the first natural language query is seeking.

Continuing from the first natural language query example above, the processing circuitry, while executing the query mapper 311, may identify the following query parameter:
measure=sales In this example, the query parameter "measure" indicates that the first natural language query is seeking to obtain data related to sales. Based on the query parameter "measure", the processing circuitry may identify one or more data objects and/or datasets associated with sales data in the feature space, and may associate these data objects and/or datasets with the first analytic operation instruction. In other words, the first analytic operation instruction may indicate that data analytic operations are to be conducted on these data objects and/or datasets. In some embodiments, the dataset associated with the first analytic operation instruction may be a multi-dimensional dataset, details of which are described herein.

In some embodiments, the processing circuitry, while executing the query mapper 311, may determine an intent of the user based on the first natural language query. In the present disclosure, the term "intent" refers to an objective or a goal that a user is trying to achieve when using the natural language query. In some embodiments, the processing circuitry, while executing the query mapper 311, may determine the intent based on the semantic frames corresponding to the natural language query. Continuing from the first natural language query example above, the processing circuitry, while executing the query mapper 311, may determine that the intent associated with the first natural language query is to obtain sales data.

In various embodiments, the processing circuitry may determine that the first natural language query may be associated with additional analytic operations or queries that may be performed with respect to the multi-dimensional dataset. In such embodiments, the processing circuitry may present such additional possibilities (e.g., suggestions or suggested valid queries) to the user, by way of response generation as described herein.

For example, given the multi-dimensional dataset, a given query may be answerable based on the multi-dimensional data set. Answerable, in this context, means that a response generated based on the given query will provide useful information to the user about the multi-dimensional dataset (e.g., the query must not generate an error message; the query must not suggest to the user to ask about time periods, dimension/measure combinations, or the like, for which there is no data). An example of how such suggestions may be generated is illustrated below, where question types are already described in the system:

(measures+dimensions+instances)+(question types) →suggested questions.

By way of further example, given the following example dataset:

| Sales | Profit | Year | Product |
|-------|--------|------|---------|
| 100   | 50     | 2020 | Coke    |
| 110   | 45     | 2020 | Pepsi   |
| 95    | 55     | 2021 | Coke    |
| 105   | 50     | 2021 | Pepsi   |

The following example questions could be proposed:
How were my sales?
How was my Profit?
How were my sales in 2021?
How was my Profit in 2020?
How were my sales of Coke in 2021?
How did my sales change year on year?
How were profit vs sales?
The follow example questions would not be proposed:
How were my Earnings? (would result in missing measure error)
How were my sales in France? (dimension not found error)
How were my sales in 1990? (no data for this time period)

In embodiments, the processing circuitry may identify that data exists for individual filters, but not for a specific combination of filters. For example, if another row existed in the dataset above such as: [100, 50, 2021, Fanta]; now "Fanta" exists so the system might suggest "How are sales of Fanta?" (if the current year is 2021) or "How are sales of Fanta in 2021?", because the combination of filters where year=2021 and product=Fanta exists in the dataset. However, the system would not suggest "How are sales of Fanta in 2020?", because there is no row in the dataset where the filter combination of year=2020 and product=Fanta exists.

In some embodiments, the processing circuitry may execute the analytics operator 312 of the dimensional data model 309 to identify at least one analytic operation type from the first natural language query. As an example, when executing the analytics operator 312, the processing circuitry may generate one or more predicted analytic operation types based on the first natural language query, and may select a predicted analytic operation type as the analytic operation type based on the selected predicted analytic operation type having a highest prediction score among the prediction scores of the predicted analytic operation types. In some embodiments, the predicted analytic operation types and their corresponding prediction scores may be generated based on one or more machine learning models and/or natural language processing algorithms (such as, but not limited to, a regression model).

While the description above provides an example of identifying the at least one analytic operation type, it is noted that the scope of the present disclosure is not limited to the description above. In some examples, an example analytic operation type may additionally, or alternatively, be identified through other methods.

Continuing from the first natural language query example above, the processing circuitry, when executing the analytics operator 312, may determine that the analytic operation type corresponding to the first natural language query is filtering.

As such, the processing circuitry, when executing a dimensional data model (including a query mapper and an analytics operator) and based on the first natural language query example above, may generate a first analytic operation instruction that defines analytic operation type as filtering and defines the following query parameters:
measure=sales
product=Nutrali
country=France
month=July
year=2020

Referring back to FIG. 5, subsequent to step/operation 505, the method 500 may proceed to step/operation 507. At step/operation 507, a processing circuitry (such as the processing circuitry 301 of the conversational data-to-text system 105 described above in connection with FIG. 1 and FIG. 2) may determine a first multi-dimensional data object.

In some embodiments, the processing circuitry may determine the first multi-dimensional data object based at least in part on the first analytic operation instruction and the multi-dimensional dataset associated with the first analytic operation instruction.

In some embodiments, a multi-dimensional dataset may include one or more multi-dimensional data objects, which may be represented in a feature space. Each multi-dimensional data object may be determined, located, and/or retrieved from the feature space based on the dimensions of the feature space and a dimension instance of each dimension (i.e. a location measure of the multi-dimensional data object in a dimension).

As described above, the analytic operation instruction may define the query parameter(s) and an analytic operation type. In some embodiments, the query parameter(s) of analytic operation instruction may specify the dimension instance(s) in a feature space associated with the multi-dimensional dataset for determining the multi-dimensional data object.

Continuing from the first natural language query example above, the query parameters of the analytic operation instruction may specify that the feature space (or datasets) associated with the first natural language query is sales data, and may specify the following dimension and dimension instances:
dimension: product; dimension instance: Nutrali
dimension: country; dimension instance: France
dimension: time; dimension instance: July 2020.

Further, in the first natural language query example above, the processing circuitry may determine that the analytic operation type indicates filtering operation. As such, the processing circuitry may conduct filtering operations based on the dimensions and dimension instances above to determine a multi-dimensional data object from the feature space that correspond to the sales data of Nutrali in France in July 2020.

While the description above provides an example of determining the first multi-dimensional data object, it is noted that the scope of the present disclosure is not limited to the description above. For example, the step/operation of determining a first multi-dimensional data object may be implemented through one or more additional or alterative steps, an example of which is described in connection with FIG. 6 herein.

Referring back to FIG. 5, subsequent to step/operation 507, the method 500 may proceed to step/operation 509. At step/operation 509, a processing circuitry (such as the processing circuitry 301 of the conversational data-to-text system 105 described above in connection with FIG. 1 and FIG. 2) may generate a first natural language response to the first natural language query.

In some embodiments, the processing circuitry may generate the first natural language response to the first natural language query based at least in part on the first multi-dimensional data object. For example, the processing circuitry may execute a response generator stored in a storage circuitry (such as the response generator 329 described and illustrated above in connection with FIG. 3).

As described above, the response generator 329 may "translate" a data object (for example, the first multi-dimensional data object determined at step/operation 507 of FIG. 5 as described above). In some embodiments, the processing circuitry, while executing the response generator 329, may conduct the translation in a variety of ways.

For example, in some embodiments, when executing the response generator 329, the processing circuitry may select a narrative function script based on the first natural language query. As defined above, a narrative function script refers to one or more algorithms for generating an output response in natural language based on a natural language query. For example, the narrative function script may define a template for generating a narrative based on an intent associated with natural language query (such as, but not limited to, an intent to obtain sales data, an intent to obtain weather information, an intent to obtain navigation directions, and/or the like). The template may include one or more boilerplate texts, as well as one or more data fields that require input when the template is used to generate a natural language response.

Continuing from the first natural language query example above, the processing circuitry may determine that the intent of the first natural language query is to obtain aggregated data of the measure Sales filtered by dimension instances. Based on the intent, the processing circuitry may select a narrative function script that corresponds to obtaining aggregated measure (sales) data (filtered by dimension instances). As an example, the selected narrative function script may define the following template for generating a natural language response associated with sales data:

In [TIME], [MEASURE] of [PRODUCT] in [COUNTRY] [Language function] [AMOUNT].

In the above example, the [language function] may be a script component that generates one or more grammar connectors for the natural language response (for example, one or more verbs and/or nouns). For example, the [language function] may be [[inflectVerb('be',form(MEASURE))]]. In the above example, the template indicates five data fields that require input to generate a natural language response: a data field indicating the time, a data field indicating the measure, a data field indicating the product, a data field indicating the country, and a data field indicating the amount.

In some embodiments, subsequent to selecting the narrative function script, the processing circuitry, while executing the response generator 329, may generate the first natural language response based at least in part on the narrative function script, the first analytic operation instruction, and the first multi-dimensional data object.

For example, the first analytic operation instruction may comprise at least one query parameter as described above. The at least one query parameter may be provided as input to the one or more data fields of the template defined by the narrative function script. Additionally, or alternatively, the first multi-dimensional data object (obtained based on the natural language query) may represent data associated with the natural language query (for example, sales data), and the data may be provided as input to the one or more data fields of the template.

Continuing from the first natural language query example above, the first analytic operation instruction may define at least the following query parameters:
product=Nutrali
country=France
month=July
year=2020

The processing circuitry may provide the query parameter of product ("Nutrali") to the PRODUCT data field of the template, the query parameter of country ("France") to the COUNTRY data field of the template, and the query parameter of month and year ("July" "2020") to the TIME data field of the template. Similarly, the first multi-dimensional data object determined at step/operation 507 may represent a sales amount of USD 1.7 million, and the processing circuitry may provide the sales amount to the AMOUNT data field of the template.

As such, based on the narrative function script (that defines a template), the first analytic operation instruction (that provides query parameter(s)), and the first multi-dimensional data object (that provides data), the processing circuitry may generate the following first natural language response:

In July 2020, sales of Nutrali in France are USD 1.2 million.

Subsequent to step/operation 509, the method 500 may proceed to step/operation 511. At step/operation 511, a processing circuitry (such as the processing circuitry 301 of the conversational data-to-text system 105 described above in connection with FIG. 1 and FIG. 2) may transmit the first natural language response to the client device.

In some embodiments, subsequent to receiving the first natural language response from the conversational data-to-text system, the client device may present the first natural language response through audio and/or non-audio means.

For example, the client device may comprise a speaker circuitry. As described above in connection with FIG. 2, the client device 101A may convert the natural language response into audio information (for example, through a text-to-speech algorithm that converts texts into an audio file). The client device 101A may output the audio file through the speaker circuitry 218. As such, a user may interact or communicate with a conversational data-to-text system through audio exchange (for example, the user providing natural language query via speaking to the client device and receiving natural language response via listening to the client device).

Additionally, or alternatively, a user may interact or communicate with a conversational data-to-text system through non-audio exchange (for example, the user providing natural language query via typing to the client device through an input/output circuitry, and receiving natural language response via reading from a display of the client device).

Subsequent to step/operation 511, the method 500 may proceed to block 513, where the example method 500 ends.

Referring now to FIG. 6, an example method 600 is illustrated. In the particular, the example method 600 illustrates an example of determining a first multi-dimensional data object.

While the example provided above in connection with step/operation 507 of FIG. 5 may be related to retrieving an existing multi-dimensional data object based on analytic operations (such as filtering), the example method 600 provides an example of generating a multi-dimensional data object in response to a natural language query.

As shown in FIG. 6, the example method 600 may start at block A from step/operation 507 of FIG. 5. Subsequent to block A, the method 600 proceeds to step/operation 602. At step/operation 602, a processing circuitry (such as the processing circuitry 301 of the conversational data-to-text system 105 described above in connection with FIG. 1 and FIG. 2) may retrieve a plurality of multi-dimensional data objects.

In some embodiments, the processing circuitry may identify at least one query parameter from the first natural language query, similar those described above in connection with step/operation 505 of FIG. 5. As an example, the following is a natural language query that may be received by the conversational data-to-text system:

How are the combined Sales of Nutrali in France between July and August?

Similar to those described above in connection with step/operation 505 of FIG. 5, the processing circuitry may determine and/or infer the following query parameters:

measure=sales
product=Nutrali
country=France
month 1=July
month 2=August
year=2020

In this example, because the query parameters indicate two dimension instances in the same dimension (e.g., time), the processing circuitry may retrieve a multi-dimensional data object corresponding to each dimension instance. For example, the processing circuitry may retrieve a multi-dimensional data object that corresponds to the sales data of Nutrali in July 2020 and a multi-dimensional data object that corresponds to the sales data of Nutrali in August 2020.

Subsequent to step/operation 602, the method 600 may proceed to step/operation 604. At step/operation 604, a processing circuitry (such as the processing circuitry 301 of the conversational data-to-text system 105 described above in connection with FIG. 1 and FIG. 2) may generate the first multi-dimensional data object.

In some embodiments, the processing circuitry may generate the first multi-dimensional data object by performing at least one analytic operation on the plurality of multi-dimensional data objects. Similar to those described above in connection with step/operation 505 of FIG. 5, the processing circuitry may identify at least one analytic operation type from the first natural language query. The processing circuitry may perform at least one analytic operation on the plurality of multi-dimensional data objects based on the at least one analytic operation type to generate the first multi-dimensional data object.

Continuing from the example above, the processing circuitry may determine that the at least one analytic operation type is grouping (e.g., conjunction or a group-by operation). The processing circuitry may perform grouping analytic operation on the multi-dimensional data objects retrieved at step/operation 602 (for example, combining the sales data of Nutrali in July 2020 and the sales data of Nutrali in August 2020) to generate the first multi-dimensional data object (for example, a combined sales data of Nutrali in July 2020 and August 2020).

While the description above provides an example of generating the first multi-dimensional data object by performing grouping operation, it is noted that the scope of the present disclosure is not limited to the description above. In some examples, other additional and/or alternative analytic operations may be performed on the plurality of multi-dimensional data objects, such as, but not limited to, variance operations.

Subsequent to step/operation 604, the example method 600 may proceed to block B, which returns to step/operation 507 of FIG. 5. For example, the processing circuitry may generate a natural language response at step/operation 509 of FIG. 5 based on the first multi-dimensional data object generated at step/operation 604 of FIG. 6.

Referring now to FIG. 7, an example method 700 is illustrated. In particular, the method 700 illustrated in FIG. 7 may describe example embodiments of generating natural language responses based at least in part on contextual data stored in a disclosure model of the conversational data-to-text system.

As shown in FIG. 7, the method 700 may start at block C that is subsequent to step/operation 511 of FIG. 5. Subsequent to block C, the method 700 proceeds to step/operation 701. At step/operation 701, a processing circuitry (such as the processing circuitry 301 of the conversational data-to-text system 105 described above in connection with FIG. 1 and FIG. 2) may update contextual data stored in a discourse model.

As described above, an example conversational data-to-text system may comprise a discourse model stored in the storage circuitry (for example, the discourse model 327 illustrated and described above in connection with FIG. 3). In some embodiments, the discourse model may comprise contextual data that may be generated and/or updated based on historical natural language queries and historical natural language responses associated with the conversational data-to-text system.

In some embodiments, the processing circuitry may update the contextual data stored in the discourse model based at least in part on a natural language query (for example, the first natural language query received at step/operation 503 of FIG. 5) and/or a natural language response that is in response to the natural language response (for example, the first natural language response generated at step/operation 509 of FIG. 5).

For example, as described above, the processing circuitry may identify at least one query parameter associated with a natural language query. Continuing from the first natural language query example above, the processing circuitry may identify the following query parameters from the first natural language query:

measure=sales
product=Nutrali
country=France
month=July
year=2020

In some embodiments, the processing circuitry may update the contextual data stored in the discourse model to include one or more of the above-referenced query parameters from the first natural language query, which provide context information associated with the first natural language query.

Additionally, or alternatively, the processing circuitry may update the contextual data stored in the discourse model based on the natural language response that is generated in response to the natural language response. Continuing from the first natural language query example above, the processing circuitry may update the contextual data stored in the discourse model based on the following first natural language response that is generated in response to the first natural language query:

In July 2020, sales of Nutrali in France are USD 1.2 million.

For example, the processing circuitry may update the update the contextual data stored in the discourse model to include data that is represented in the first natural language response (e.g. USD 1.2 million).

Subsequent to step/operation 703, the method 700 may proceed to step/operation 703. At step/operation 703, a processing circuitry (such as the processing circuitry 301 of the conversational data-to-text system 105 described above in connection with FIG. 1 and FIG. 2) may receive a second natural language query, similar to those described above in connection with step/operation 503 of FIG. 5. For example, the second natural language query may be received by the conversational data-to-text system subsequent to transmitting a first natural language response in response to a first natural language query.

For example, the following example query-response exchange provides examples of first natural language query, first natural language response, and second natural language query:

Frist Natural Language Query: How are Sales of Nutrali in France for July?
Frist Natural Language Response: In July 2020, sales of Nutrali in France are USD 1.2 million.
Second Natural Language Query: How about in Germany?

Subsequent to step/operation 703, the method 700 may proceed to step/operation 705. At step/operation 705, a processing circuitry (such as the processing circuitry 301 of the conversational data-to-text system 105 described above in connection with FIG. 1 and FIG. 2) may generate a second analytic operation instruction.

In some embodiments, the processing circuitry may generate the second analytic operation instruction based at least in part on the second natural language query and the contextual data stored in the discourse model.

For example, as shown in FIG. 7, when generating the second analytic operation instruction at step/operation 705, the processing circuitry may generate at least one inferred query parameter based on the second natural language query and the contextual data at step/operation 707. In some embodiments, the least one inferred query parameter may be generated based on historical query parameters associated with a previous natural language query or a previous natural language response that are stored in the contextual data of the discourse model.

Continuing from the example above, the processing circuitry may identify the following query parameter from the second natural language query ("How about in Germany?"):
country=Germany While the second natural language query does not explicitly provide query parameters such as country or date, the processing circuitry may infer these query parameters (and thus generate at least one inferred query parameter) from the contextual data stored in the discourse model. For example, the contextual data may comprise the following query parameters from the first natural language query:

measure=sales
product=Nutrali
month=July
year=2020

The processing circuitry may combine the query parameter identified from the second natural language query and inferred query parameters based on the contextual data, creating the following query parameters for the second analytic operation instruction:
measure=sales
product=Nutrali
country=Germany
month=July
year=2020

In some embodiments, the processing circuitry may identify the corresponding analytic operation type of the analytic operation instruction based on the second natural language query, similar to those described above in connection with step/operation 505 of FIG. 5.

Subsequent to step/operation 705 (or step/operation 707), the method 700 may proceed to step/operation 709. At step/operation 709, a processing circuitry (such as the processing circuitry 301 of the conversational data-to-text system 105 described above in connection with FIG. 1 and FIG. 2) may determine a second multi-dimensional data object.

For example, as shown in FIG. 7, when determining the second multi-dimensional data object at step/operation 709, the processing circuitry may determine the second multi-dimensional data object based at least in part on inferred query parameter as shown in step/operation 711.

Continuing from the example above, the processing circuitry may determine the second multi-dimensional data object based at least in part on the following query parameters:
measure=sales
product=Nutrali
country=Germany
month=July
year=2020

As discussed above, query parameters such as measure, product, month, and year are inferred query parameters generated based at least in part on the second natural language query and the contextual data stored in the disclosure model.

In some embodiments, the processing circuitry may determine a second multi-dimensional data object based at least in part on the second analytic operation instruction and the multi-dimensional dataset. For example, the processing circuitry may perform data analytic operations on one or more multi-dimensional data objects in the dataset to determine the second multi-dimensional data object, similar to those described in connection with at least step/operation 507 of FIG. 5 and/or method 600 of FIG. 6.

Subsequent to step/operation 709 (or step/operation 711), the method 700 may proceed to step/operation 713. At step/operation 713, a processing circuitry (such as the processing circuitry 301 of the conversational data-to-text system 105 described above in connection with FIG. 1 and FIG. 2) may generate a second natural language response.

In some embodiments, the processing circuitry may generate the second natural language response to the second natural language query based at least in part on the second multi-dimensional data object, similar to those described above in connection with step/operation 509 of FIG. 5.

Subsequent to step/operation 715, the method 700 may proceed to step/operation 715. At step/operation 715, a processing circuitry (such as the processing circuitry 301 of the conversational data-to-text system 105 described above in connection with FIG. 1 and FIG. 2) may transmit the second natural language response to the client device, similar to those described above in connection with step/operation 511 of FIG. 5.

Subsequent to step/operation 715, the example method 700 proceeds to block 717 and ends.

Additional Implementation Details

Although example processing systems have been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. A computer-readable storage medium can be, or be included in, a computer-readable storage device, a computer-readable storage substrate, a random or serial access memory array or device, or a combination of one or more of them. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random-access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer needs not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., an LCD monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML (Hypertext Markup Language) page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as description of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

The invention claimed is:

1. An apparatus comprising at least one processor and at least one non-transitory memory comprising program code, the at least one non-transitory memory and the program code configured to, the at least one processor, cause the apparatus to at least:
receive a first natural language query from a client device;
generate, based at least in part on the first natural language query, one or more semantic frames;
retrieve, based at least in part on the one or more semantic frames, a multi-dimensional dataset comprising one or more multi-dimensional data objects each placed in a feature space of a plurality of feature spaces, wherein each feature space comprises one or more dimensions corresponding to categorical data;
generate, based at least in part on the one or more semantic frames, an expected structure of a resulting multi-dimensional data object and a first analytic operation query to be performed on the resulting multi-dimensional data object, wherein the first analytic operation query defines at least one analytic operation type of a plurality of analytic operation types;
generate, based at least in part on executing the first analytic operation query on the resulting multi-dimensional data object, insights associated with data represented by the resulting multi-dimensional data object;
generate a first natural language response to the first natural language query based at least in part on the insights;
convert the first natural language response from text to audio output; and
transmit the audio output of the first natural language response to the client device.

2. The apparatus of claim 1, wherein the first analytic operation query further defines at least one query parameter.

3. The apparatus of claim 2, wherein the at least one query parameter corresponds to a dimension instance in a feature space of the plurality of feature spaces associated with the multi-dimensional dataset.

4. The apparatus of claim 2, wherein the at least one analytic operation type comprises one or more of a filtering operation, a grouping operation, or a variance operation.

5. The apparatus of claim 3, wherein the feature space comprises a corresponding measure representing numerical data that a given multi-dimensional data object represents.

6. The apparatus of claim 1, wherein the at least one non-transitory memory and the program code configured to, with the at least one processor, cause the apparatus to further:
select a narrative function script based at least in part on the first natural language query; and
generate the first natural language response further based at least in part on the narrative function script.

7. The apparatus of claim 1, wherein, subsequent to transmitting the first natural language response to the client device, the at least one non-transitory memory and the program code are configured to, with the at least one processor, cause the apparatus to further:
update contextual data stored in a discourse model based at least in part on the first natural language query and the first natural language response;
receive a second natural language query from the client device;
generate, based at least in part on the second natural language query and the contextual data, a second analytic operation query associated with the multi-dimensional dataset;
generate, based at least in part on the multi-dimensional dataset and executing the second analytic operation query, a second multi-dimensional data object;

generate a second natural language response to the second natural language query based at least in part on the second multi-dimensional data object; and transmit the second natural language response to the client device.

8. The apparatus of claim 7, wherein, when generating the second analytic operation query, the at least one non-transitory memory and the program code are configured to, with the at least one processor, cause the apparatus to further:

generate at least one inferred query parameter based at least in part on the second natural language query and the contextual data.

9. The apparatus of claim 8, wherein, when generating the second multi-dimensional data object, the at least one non-transitory memory and the program code are configured to, with the at least one processor, cause the apparatus to further:

generate the second multi-dimensional data object based at least in part on the at least one inferred query parameter.

10. A computer-implemented method comprising:

receiving a first natural language query from a client device;

generating, based at least in part on the first natural language query, one or more semantic frames;

retrieving, based at least in part on the one or more semantic frames, a multi-dimensional dataset comprising one or more multi-dimensional data objects each placed in a feature space of a plurality of feature spaces, wherein each feature space comprise one or more dimensions corresponding to categorical data;

generating, based at least in part on the one or more semantic frames, an expected structure of a resulting multi-dimensional data object and a first analytic operation query to be performed on the resulting multi-dimensional data object, wherein the first analytic operation query defines at least one analytic operation type of a plurality of analytic operation types;

generating, based at least in part on executing the first analytic operation query on the resulting multi-dimensional data object, insights associated with data represented by the resulting multi-dimensional data object;

generating a first natural language response to the first natural language query based at least in part on the insights;

converting the first natural language response from text to audio output; and transmitting the audio output of the first natural language response to the client device.

11. The computer-implemented method of claim 10, wherein the first analytic operation query further defines at least one query parameter.

12. The computer-implemented method of claim 11, wherein the at least one query parameter corresponds to a dimension instance in a feature space of the plurality of feature spaces associated with the multi-dimensional dataset.

13. The computer-implemented method of claim 11, wherein the at least one analytic operation type comprises one or more of a filtering operation, a grouping operation, or a variance operation.

14. The computer-implemented method of claim 11, wherein the feature space comprises a corresponding measure representing numerical data that a given multi-dimensional data object represents.

15. The computer-implemented method of claim 10, further comprising:

selecting a narrative function script based at least in part on the first natural language query; and generating the first natural language response further based at least in part on the narrative function script.

16. The computer-implemented method of claim 10, wherein, subsequent to transmitting the first natural language response to the client device, the computer-implemented method further comprises:

updating contextual data stored in a discourse model based at least in part on the first natural language query and the first natural language response;

receiving a second natural language query from the client device;

generating, based at least in part on the second natural language query and the contextual data, a second analytic operation query associated with the multi-dimensional dataset;

generating a second multi-dimensional data object based at least in part on the multi-dimensional dataset and executing the second analytic operation query;

generating a second natural language response to the second natural language query based at least in part on the second multi-dimensional data object; and transmitting the second natural language response to the client device.

17. The computer-implemented method of claim 16, wherein generating the second analytic operation query further comprises:

generating at least one inferred query parameter based at least in part on the second natural language query and the contextual data.

18. The computer-implemented method of claim 17, wherein generating the second multi-dimensional data object is further based at least in part on the at least one inferred query parameter.

19. A computer program product comprising at least one non-transitory computer-readable storage medium having computer-readable program code portions stored therein, the computer-readable program code portions comprising an executable portion configured to:

receive a first natural language query from a client device;

generate, based at least in part on the first natural language query, one or more semantic frames;

retrieve, based at least in part on the one or more semantic frames, a multi-dimensional dataset comprising one or more multi-dimensional data objects each placed in a feature space of a plurality of feature spaces, wherein each feature space comprises one or more dimensions corresponding to categorical data;

generate, based at least in part on the one or more semantic frames, an expected structure of a resulting multi-dimensional data object and a first analytic operation query to be performed on the resulting multi-dimensional data object, wherein the first analytic operation query defines at least one analytic operation type of a plurality of analytic operation types;

generate, based at least in part on executing the first analytic operation query on the resulting multi-dimensional data object, insights associated with data represented by the resulting multi-dimensional data object;

generate a first natural language response to the first natural language query based at least in part on the insights;

convert the first natural language response from text to audio output; and transmit the audio output of the first natural language response to the client device.

20. The computer program product of claim 19, wherein the first analytic operation query defines at least one query parameter.

21. The computer program product of claim 20, wherein the at least one query parameter corresponds to a dimension instance in a feature space of the plurality of feature spaces associated with the multi-dimensional dataset.

22. The computer program product of claim 20, wherein the at least one analytic operation type comprises one or more of a filtering operation, a grouping operation, or a variance operation.

23. The computer program product of claim 20, wherein the feature space comprises a corresponding measure representing numerical data that a given multi-dimensional data object represents.

24. The computer program product of claim 19, wherein, the computer-readable program code portions comprise the executable portion configured to:
select a narrative function script based at least in part on the first natural language query; and
generate the first natural language response based at least in part on the narrative function script.

25. The computer program product of claim 19, wherein, subsequent to transmitting the first natural language response to the client device, the computer-readable program code portions further comprise the executable portion configured to:
update contextual data stored in a discourse model based at least in part on the first natural language query and the first natural language response;
receive a second natural language query from the client device;
generate, based at least in part on the second natural language query and the contextual data, a second analytic operation query associated with the multi-dimensional dataset;
generate, based at least in part on the multi-dimensional dataset and executing the second analytic operation query, a second multi-dimensional data object;
generate a second natural language response to the second natural language query based at least in part on the second multi-dimensional data object; and
transmit the second natural language response to the client device.

26. The computer program product of claim 25, wherein, when generating the second analytic operation query, the computer-readable program code portions comprise the executable portion configured to:
generate at least one inferred query parameter based at least in part on the second natural language query and the contextual data.

27. The computer program product of claim 26, wherein generating the second multi-dimensional data object is further based at least in part on the at least one inferred query parameter.

* * * * *